(12) United States Patent
Andrivon et al.

(10) Patent No.: US 12,047,612 B2
(45) Date of Patent: Jul. 23, 2024

(54) LUMA MAPPING WITH CHROMA SCALING (LMCS) LUT EXTENSION AND CLIPPING

(71) Applicant: INTERDIGITAL CE PATENT HOLDINGS, SAS, Paris (FR)

(72) Inventors: Pierre Andrivon, Liffre (FR); Edouard Francois, Bourg des Comptes (FR); Franck Hiron, Chateaubourg (FR); Christophe Chevance, Brece (FR)

(73) Assignee: INTERDIGITAL CE PATENT HOLDINGS, SAS, Paris (FR)

( * ) Notice: Subject to any disclaimer, the term of this patent is extended or adjusted under 35 U.S.C. 154(b) by 174 days.

(21) Appl. No.: 17/617,369

(22) PCT Filed: Jun. 19, 2020

(86) PCT No.: PCT/EP2020/067081
§ 371 (c)(1),
(2) Date: Dec. 8, 2021

(87) PCT Pub. No.: WO2020/254564
PCT Pub. Date: Dec. 24, 2020

(65) Prior Publication Data
US 2022/0256202 A1 Aug. 11, 2022

(30) Foreign Application Priority Data
Jun. 21, 2019 (EP) .................... 19290044

(51) Int. Cl.
*H04N 19/85* (2014.01)
*H04N 19/176* (2014.01)
*H04N 19/70* (2014.01)

(52) U.S. Cl.
CPC .......... *H04N 19/85* (2014.11); *H04N 19/176* (2014.11); *H04N 19/70* (2014.11)

(58) Field of Classification Search
CPC ....... H04N 19/85; H04N 19/176; H04N 19/70
See application file for complete search history.

(56) References Cited

U.S. PATENT DOCUMENTS

2018/0278967 A1    9/2018  Kerofsky et al.
2018/0359489 A1*  12/2018  Lakshman ........... H04N 19/597
(Continued)

FOREIGN PATENT DOCUMENTS

WO    WO2019006300        1/2019
WO    WO-2020185984 A1 *  9/2020  ............... G06F 1/03

OTHER PUBLICATIONS

Andrivon, et al., Non-CE2: Inverse LUT Carriage for LMCS, 15. JVET Meeting; Jul. 3, 2019-Jul. 12, 2019, Gothenburg; (The Joint Video Exploration Team of ISO/IEC JTC1/SC29/WG11 and ITU-T SG.16), No. JVET-O0448.

(Continued)

*Primary Examiner* — Farzana Hossain
(74) *Attorney, Agent, or Firm* — Ronald Kolczynski

(57) ABSTRACT

Methods and apparatus provide mapping functions for video encoding or decoding by replacing a pivot point of a uniformly sampled inverse mapping function by another pivot point not located on an original non-uniformly sampled inverse mapping function. In one embodiment a last pivot point of the inverse mapping function is extended based on a previous slope whose curve is plotted between two previous pivot points or based on the preservation of the slope which is dual to the existing slope of the equivalent section in the forward mapping function. Syntax is provided that assists the mapping and inverse mapping and clipping.

16 Claims, 19 Drawing Sheets

(56) References Cited

U.S. PATENT DOCUMENTS

2020/0029096 A1\* 1/2020 Rusanovskyy ........ H04N 19/52
2022/0007018 A1   1/2022 Francois et al.
2022/0191481 A1   6/2022 Andrivon et al.

OTHER PUBLICATIONS

Francois, et al., CE12-Related: In-Loop Luma Reshaping With Approximate Inverse Mapping Function, Document: JVET-M0640, Joint Video Experts Team (JVET) of ITU-T SG 16 WP 3 and ISO/IEC JTC 1/SC 29/WG 11, 13th Meeting: Marrakech, MA, pp. 1-6, Jan. 9-18, 2019.

\* cited by examiner

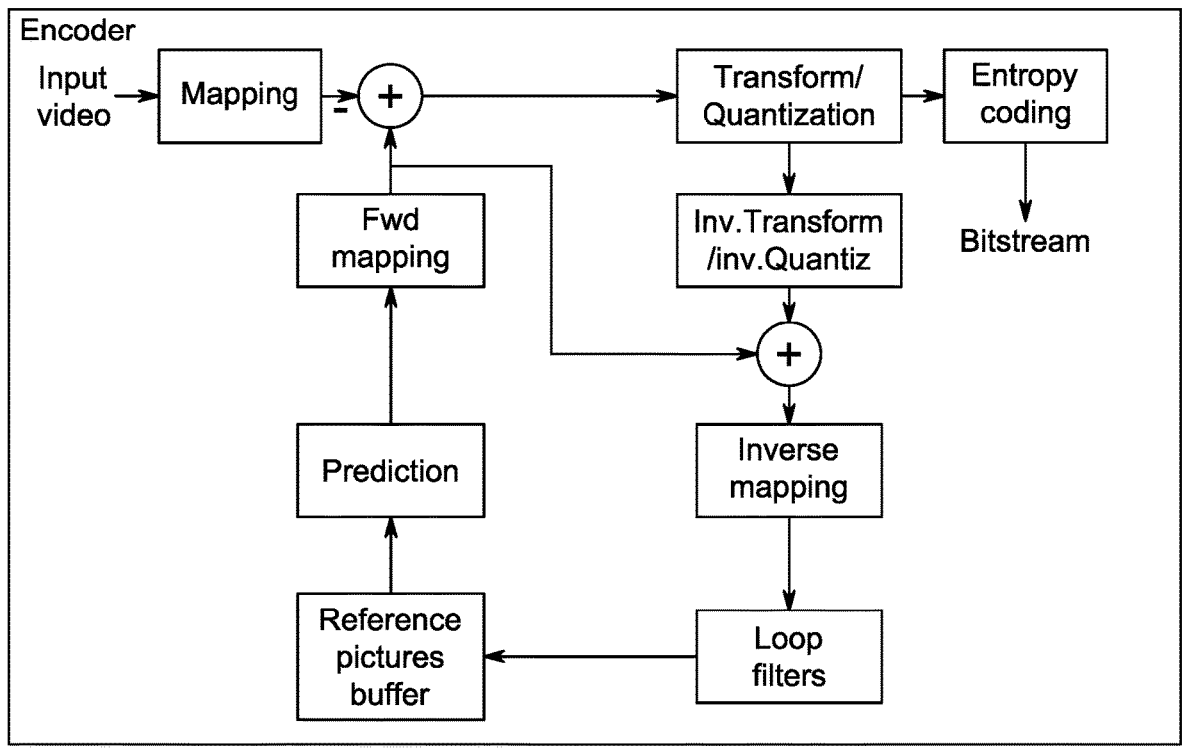
(a)
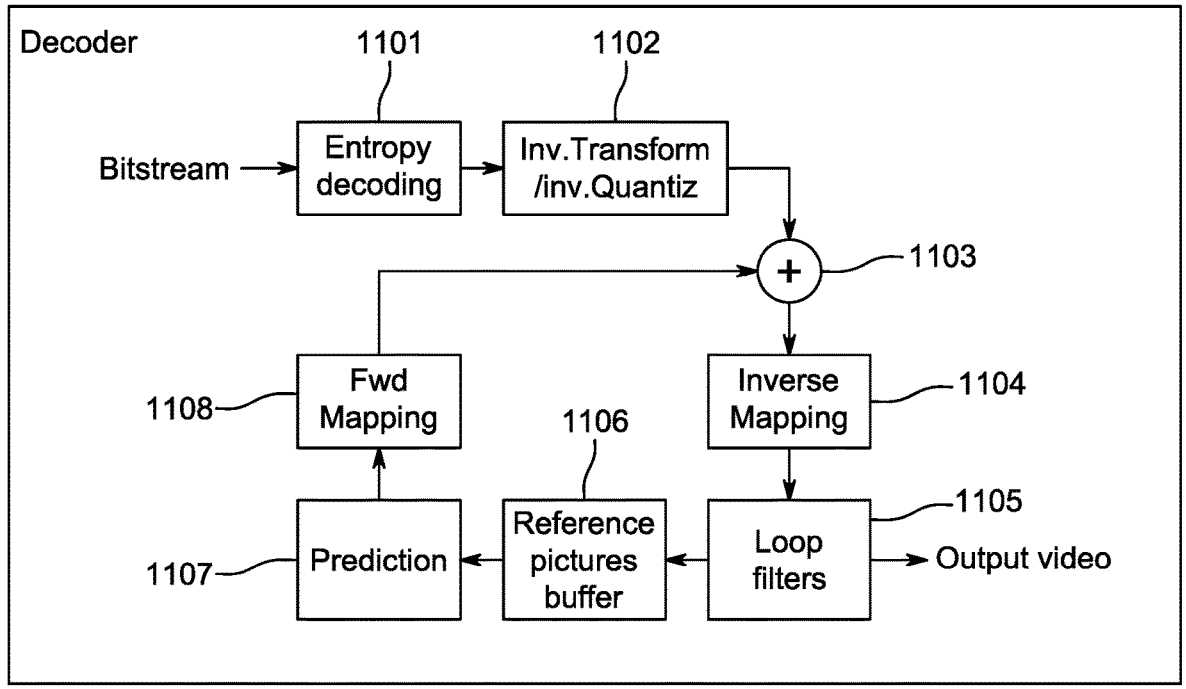
(b)
Figure 1

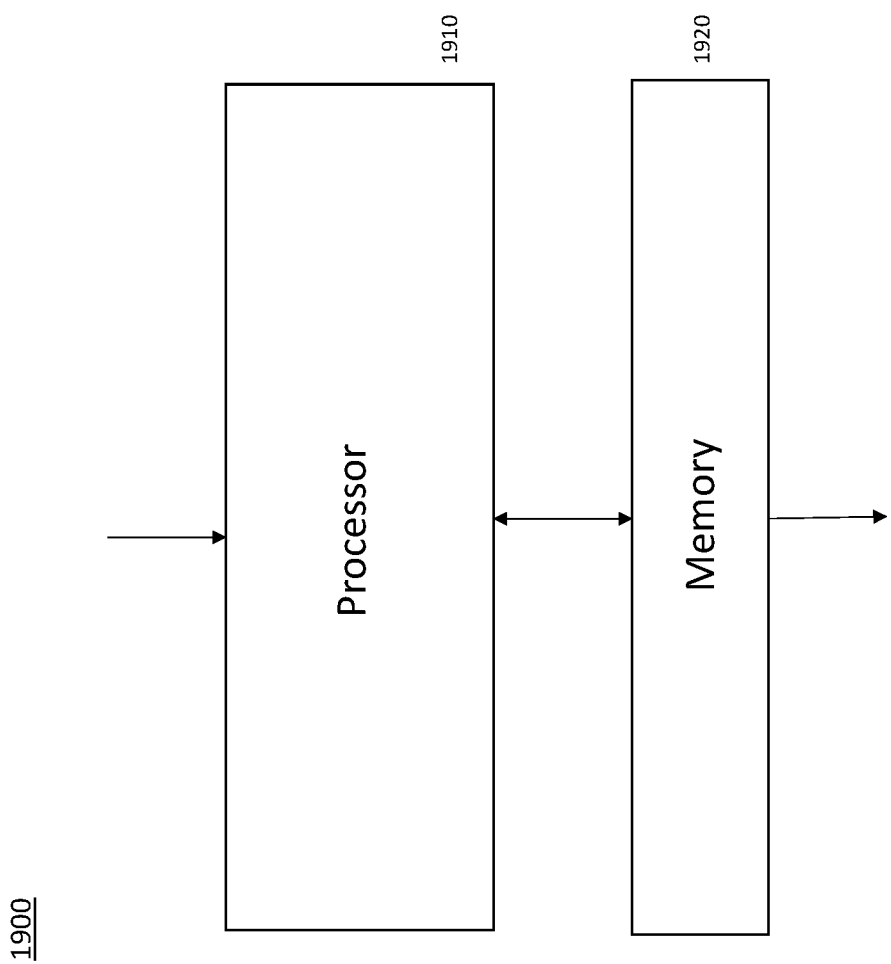

LUMA MAPPING WITH CHROMA SCALING (LMCS) LUT EXTENSION AND CLIPPING

FIELD OF THE INVENTION

The general aspects described herein are in the field of video compression, and they aim at improving compression efficiency compared to existing video compression systems.

BACKGROUND OF THE INVENTION

The aspects described can apply generically to coded video content (e.g. Standard Dynamic Range (SDR), High Dynamic Range (HDR)), but it is particularly applicable when mapping and inverse mapping processes are used in an encoder and decoder to achieve improved coding performance. Indeed, for better coding efficiency, signal mapping may be used.

SUMMARY OF THE INVENTION

These and other drawbacks and disadvantages of the prior art are addressed by the present described embodiments, which are directed to a method and apparatus to manage a trade-off between the coding efficiency provided by FRUC tools and its complexity.

According to an aspect of the described embodiments, there is provided a method. The method comprises steps for determining a non-uniformly sampled inverse mapping function from a uniformly sampled forward mapping function by swapping coordinates of two or more pivot points of the forward mapping function and interpolating points between swapped pivot points; selecting pivot points of the inverse mapping function to be aligned on a uniformly sampled grid to refine the inverse mapping function; replacing a portion of the uniformly sampled inverse mapping function by a pivot point located at the intersection between incriminated pivot point abscissa of uniform sampling grid and a line defined by two non-uniform pivots points preceding an incriminated pivot point of a non-uniform last slope preservation; replacing an ordinate value of one or more pivot points following the replaced pivot point with an ordinate value of the replacing pivot point if the replaced pivot point is a last pivot point before saturation; clipping a value of the uniformly sampled inverse mapping based on a value; and, encoding a video block using the forward and inverse mapping functions including a syntax element indicative of said value According to another aspect of the described embodiments, there is provided a second method. The method comprises steps for parsing a bitstream for syntax information indicative of a mapping function; determining a non-uniformly sampled inverse mapping function from a uniformly sampled forward mapping function by swapping coordinates of two or more pivot points of the forward mapping function and interpolating points between swapped pivot points; selecting pivot points of the inverse mapping function to be aligned on a uniformly sampled grid to refine the inverse mapping function; replacing a portion of the uniformly sampled inverse mapping function by a pivot point located at the intersection between incriminated pivot point abscissa of uniform sampling grid and a line defined by two non-uniform pivots points preceding an incriminated pivot point of a non-uniform last slope preservation; replacing an ordinate value of one or more pivot points following the replaced pivot point with an ordinate value of the replacing pivot point if the replaced pivot point is a last pivot point before saturation; clipping a value of the uniformly sampled inverse mapping based on a value; and, decoding a video block using the forward and inverse mapping functions based on said syntax information.

According to another aspect of the described embodiments, there is provided an apparatus. The apparatus comprises a memory and a processor. The processor can be configured to encode or decode a portion of a video signal by any of the above mentioned methods.

According to another general aspect of at least one embodiment, there is provided a device comprising an apparatus according to any of the decoding embodiments; and at least one of (i) an antenna configured to receive a signal, the signal including the video block, (ii) a band limiter configured to limit the received signal to a band of frequencies that includes the video block, or (iii) a display configured to display an output representative of a video block.

According to another general aspect of at least one embodiment, there is provided a non-transitory computer readable medium containing data content generated according to any of the described encoding embodiments or variants.

According to another general aspect of at least one embodiment, there is provided a signal comprising video data generated according to any of the described encoding embodiments or variants.

According to another general aspect of at least one embodiment, a bitstream is formatted to include data content generated according to any of the described encoding embodiments or variants.

According to another general aspect of at least one embodiment, there is provided a computer program product comprising instructions which, when the program is executed by a computer, cause the computer to carry out any of the described decoding embodiments or variants.

These and other aspects, features and advantages of the present principles will become apparent from the following detailed description of exemplary embodiments, which is to be read in connection with the accompanying drawings.

BRIEF DESCRIPTION OF THE DRAWINGS

FIG. 1 illustrates In-loop reshaping of prediction signal—top: encoder, bottom: decoder.

FIG. 19 illustrates one embodiment of an apparatus under the general aspects described.

DETAILED DESCRIPTION

Figure 2:
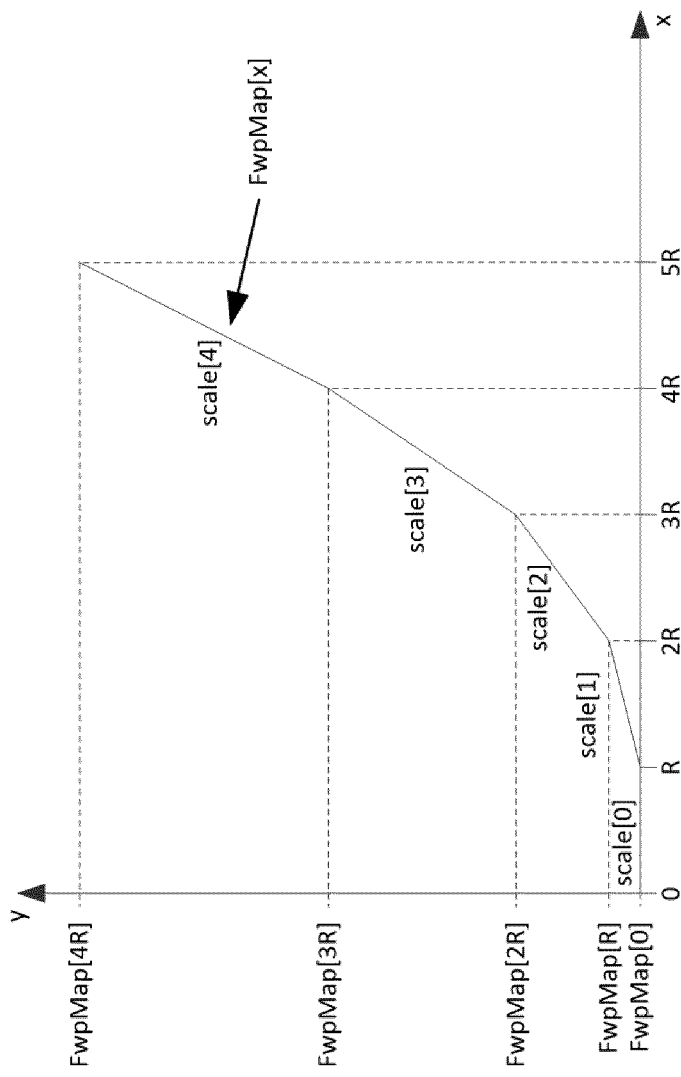
FIG. 2 is an illustration of the construction of the forward mapping function.

The domain of the embodiments described herein is video compression, intended to improve the video compression efficiency of state of the art video coding schemes. They aim at improving compression efficiency compared to existing video compression systems.

Mapping aims at better exploiting the samples codewords values distribution of the video pictures. The mapping and inverse mapping can be out of the decoding loop. In this case the mapping directly applies to the input samples of the encoder, prior to the core encoding. The inverse mapping process applies at decoder side to the output samples from the decoder. The mapping and inverse mapping can also be in the decoding loop, as proposed in a first prior method.

This method and another describe in-loop reshaping solutions to improve coding efficiency. In these solutions, a mapping (a.k.a. reshaping) of the luma or chroma signal is achieved internally to the coding loop. The reshaping applies to the prediction signal, and in the encoder or decoder, additional blocks of reshaping and inverse reshaping are added to the conventional encoder and decoder block diagrams. This is illustrated in FIG. 1 where the reshaping is applied to the prediction luma or chroma signal. It is noted that reshaping is informatively documented in a JVET document including luma mapping with chroma scaling (LMCS).

At the encoder, the residual signal before quantization, Res_source, is generated according to the following formula:

$$\text{Res\_source}(p)=\text{map}[\text{Orig}(p)]-\text{map}[\text{Pred}(p)] \quad \text{(eq. 1)}$$

where Orig(p) is the value of the source sample (to be coded) at location p(x,y) in the picture, Pred(p) is the value of the prediction sample, and Res_source(p) is the value of the prediction residual sample before quantization, map[.] is the reshaping function.

Res_source(p) is then transformed, quantized. The inverse quantized and inverse transformed residual signal is noted Res(p).

At the decoder, the signal is reconstructed according to the following formula (shown in FIG. 1(*b*)):

$$\text{Rec}(p)=\text{invmap}[\text{map}[\text{Pred}(p)]+\text{Res}(p)] \quad \text{(eq. 2)}$$

Preferably implemented into 3 steps:

Step 1108:

$$\text{Rec0}(p)=\text{map}[\text{Pred}(p)] \quad \text{(eq. 3)}$$

Step 1103:

$$\text{Rec1}(p)=\text{Rec0}(p)+\text{Res}(p) \quad \text{(eq. 4)}$$

Step 1104:

$$\text{Rec}(p)=\text{invmap}[\text{Rec1}(p)] \quad \text{(eq. 5)}$$

where Rec(p) is the value of the reconstructed sample, invmap[.] is the inverse reshaping function (inverse of map[.] such that invmap[map[x]]=x). In methods described in JVET-M0427 and JVET-L0247, this process is performed for each sample of the processed blocks. The functions of mapping and inverse mapping are global to the entire picture, or to areas of the picture. Among the different blocks of the picture or of the areas of blocks, the same functions are used.

The mapping function implementation (in JVET-M0427 and JVET-L0247) is based on a scaling table, scale[k], k=0 to N−1, N being a power of 2 (typically 16 or 32). Each scale applies to a range of luma values. The range R is fixed and power of 2 (R=2K), and is equal to the full luma range (rangeY) divided by N. For instance, for a 10-bit luma signal, and for N=16, R=1024/N=64=$2^6$ (K=6). The mapping function FwdMap is conceptually defined as follows:

FwdMap[0]=0

Then values at each k*R index, for k=0 to N, are computed, as follows:

$$\text{FwdMap}[(k+1)*R]=\text{FwdMap}[k*R]+R*\text{scale}[k]$$

The intermediate values at indices x=(k*R+1) to ((k+1)*R−1), are linearly interpolated from their surrounding values FwdMap[(k+1)*R] and FwdMap[k*R] as follows:

$$\text{FwdMap}[x]=\text{FwdMap}[k*R]+(x-k*R)*(\text{FwdMap}[(k+1)*R]-\text{FwdMap}[k*R])/R$$

Note that this process requires that the LUT FwdMap has (rangeY+1) elements, from Y=0 to rangeY, even if the actual maximum sample value Y is equal to (rangeY−1).

The process is illustrated in FIG. 2. Each scale is associated with a segment of the piece-wise linear mapping function. Each segment is specified on a luma range of same length (R).

The advantage of using intervals with uniform sampling (same interval length), of length R, is that the mapping of a sample value Y can be easily performed on-the-fly by a simple access to look-up-tables of limited size (size N), using an index computed from the value Y shifting by K bits. This process is conceptually as follows:

Computation of the index k=Y/R=Y>>K $$Y\text{map}=\text{scale}[k]*Y+A[k]$$

where A is a pre-built look-up-table of size (N+1), derived as follows (for k=0 to N):

$$A[k]=\text{FwdMap}[k*R]-k*R*\text{scale}[k]$$

The current core syntax as described in JVET-M0427 is as follows:

| | Descriptor |
|---|---|
| tile_group_reshaper_model ( ) { | |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i++ ) { | |
|     reshape_model_bin_delta_abs_CW [ i ] | U(v) |
|     if (reshaper_model_bin_delta_abs_CW[ i ] ) > 0 ) | |
|       reshaper_model_bin_delta_sign_CW_flag[ i ] | U(1) |
|   } | |
| } | | where basically:

reshaper_model_min_bin_idx is representative of the abscise (x) from which the scale[i] on FIG. 2 are carried in the bitstream.

reshaper_model_delta_max_bin_idx is representative of the abscise (x) until which the scale[i] on FIG. 2 are carried in the bitstream. This is coded relatively to reshaper_model_min_bin_idx.

reshaper_model_bin_delta_abs_cw_prec_minus1 is representative of the number of bits used to code scale[i] or FwdMap[i] on FIG. 2.

reshape_model_bin_delta_abs_CW[i] is representative of the absolute scale[i] or FwMap[i] on FIG. 2.

reshaper_model_bin_delta_sign_CW_flag[i] is representative of the sign of scale[i] or FwdMap[i] on FIG. 2.

A sampled forward mapping function representative of FwdMap may be transmitted in the bitstream thanks to the syntax elements provided in the previous section. FwdMap is required during the forward mapping stage (1108). In the current design, FwdMap is a uniformly sampled mapping function which may be represented as a Look-Up Table (LUT)—see FIG. 2.

The inverse mapping stage (1104) requires an inverse mapping function InvMap which is built as the inverse of the forward mapping function. It is mathematically built as the symmetric function of FwdMap related to the line defined by y=x, as illustrated in FIG. 3.

Figure 3:
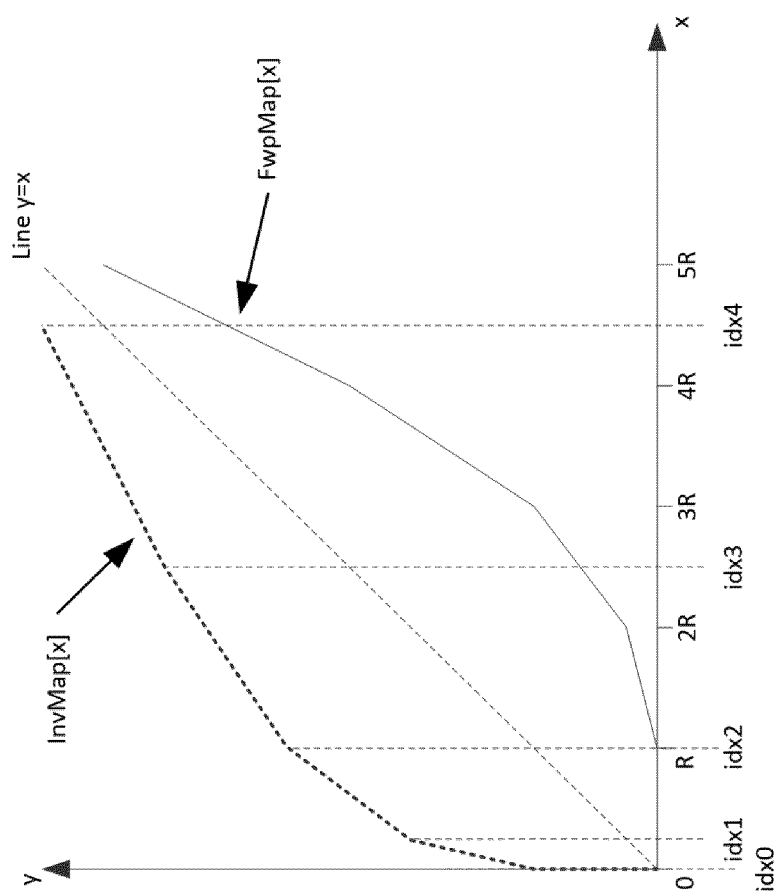
FIG. 3 illustrates illustration of the construction of the inverse mapping function.

Generally speaking, when FwdMap is uniformly sampled, InvMap is non-uniformly sampled by design (see location of indices "idx" in FIG. 3).

Figure 4:
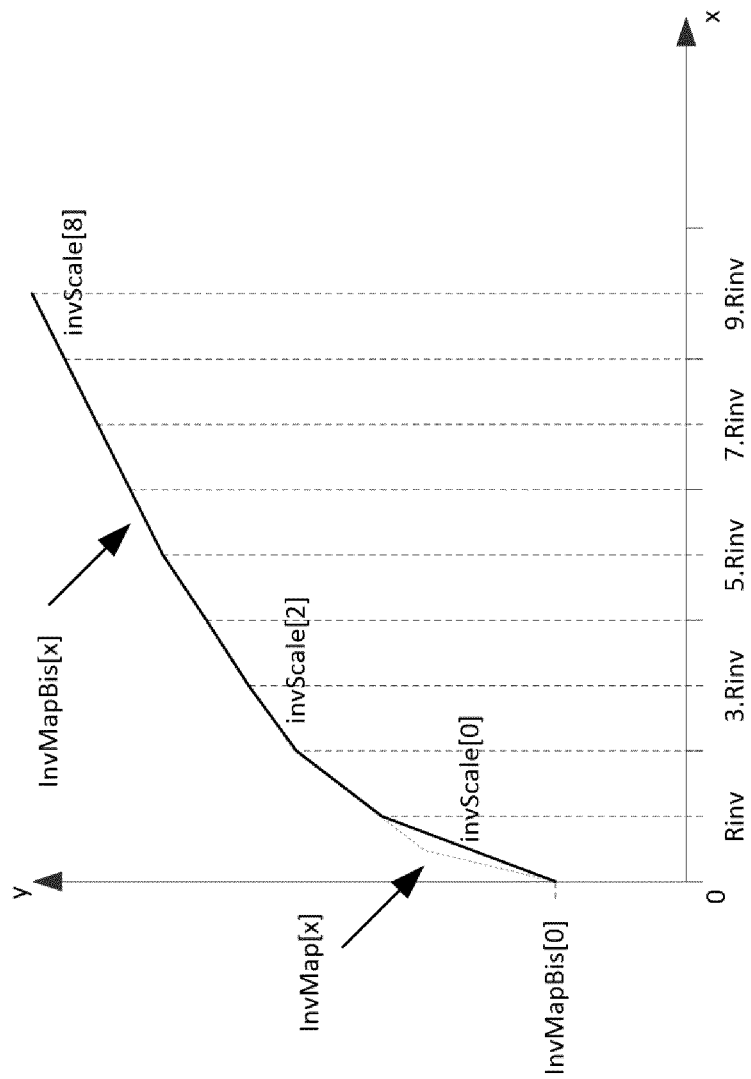
FIG. 4 illustrates uniformization of the inverse mapping function.

For some reasons, for example when one wants to carry information data representative of the pivot points of the inverse mapping function (or inverse Look-Up Table or inverse LUT) instead of information data representative of the pivot points of the forward mapping function, InvMap sampling may be a process to get uniformly sampled (see FIG. 4). This uniformization process outputs an approximated inverse mapping function as can be seen in FIG. 4 (dashed line against solid line). This approximation may beget a drop of reshaping performance for two main reasons: the forward mapping function and the approximated mapping function are not inverses of each other and the forward mapping function may be highly sensitive to statistics consequently any deviation of the original FwdMap or original InvMap function may skew the results.

Figure 5:
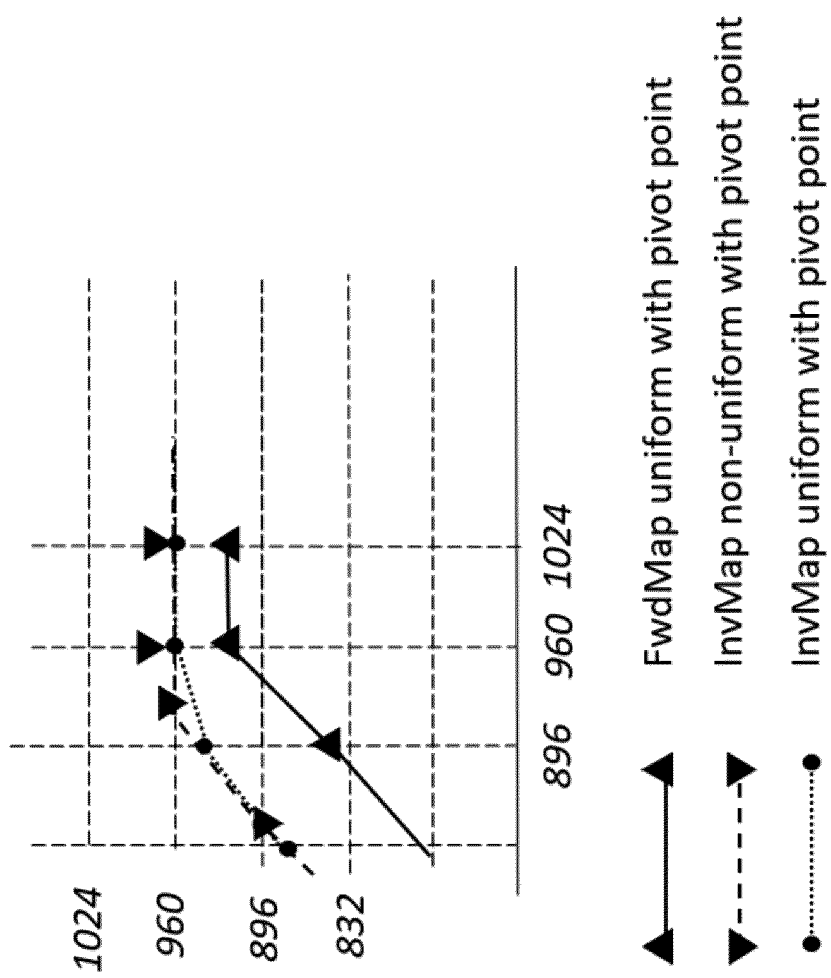
FIG. 5 illustrates uniformization of the inverse mapping function.

FIG. 5 illustrates uniformization of InvMap creating a deviation between non-uniform InvMap and uniform InvMap on a portion of the mapping curve. Typically, the deviation appears as a different slope than the original InvMap on a given section because the pivot points between original InvMap and the approximated InvMap are different. This issue may happen on any portion of the mapping function, but it is particularly true when considering the last portion of the inverse mapping function which may be subject to clipping for instance to restrict LUT precision to a limited bit-depth (e.g. 10-bit). Thus, on this last portion, the inverse mapping function and forward mapping function may not have dual slopes consequently inversibility on this section may be jeopardized.

As an example, the sequence BQSquare shows a penalty of 0.41% luma when carrying uniformly sampled InvMap rather than the original uniformly sampled FwdMap.

A solution would be to change forward mapping function so that the issue is minimized with the inverse mapping function. However, forward mapping function is computed from content statistics and modifying the forward function may lower performance of the forward/inverse mapping function.

The creation (and carriage) of a uniformly sampled inverse reshaping function was proposed in a previous disclosure. The intent of these described aspects is to reduce the deviation or error between the forward and inverse reshaping functions that are both uniformly sampled, thanks to error minimization with MSE optimization.

Another disclosure proposes to carry a uniformly sampled inverse reshaping function rather than the forward reshaping function. The problem previously stated occurred when implementing one of the earlier approaches.

The general aspects described herein propose to replace a pivot point of the (uniformly sampled) inverse mapping function by another pivot point not located on the original (non-uniformly sampled) inverse mapping function; typically by extending a last pivot point of the inverse mapping function thanks to previous slope (whose curve can be plotted between the two previous pivot points) or thanks to the preservation of the slope which is dual to the existing slope of the equivalent section in the forward mapping function.

Possibly, this replaced pivot point is:
the last pivot point of the inverse mapping function signaled in a bitstream
out of range of the domain on which the forward or inverse mapping functions are defined
combined with a syntax element in order to clip the slope (which associated curve is joining the replacing pivot point and the pivot point just before the replacing pivot point) to a certain value indicated by this syntax element.

Embodiment—Inverse Mapping Function Extension

Basically, one idea is to replace a pivot point of the straightforwardly created uniformly sampled inverse mapping function by preserving the slope of the associated portion of curve of the non-uniformly sampled inverse mapping function rather than using the pivot point obtained by a straightforward uniformization of the non-uniformly sampled inverse mapping function.

It is noted that step 0 and step 1 provided below correspond to state of the art and are exhaustively described in another disclosure.

It is noted that there is mention of bin and pivot point in this document. This document uses the same definition as VVC draft 5 where, as a simplification, a bin may be a difference between two successive pivot points ordinate values of a reshaper function i.e.

$$\text{bin}[i] = \text{reshapePivot}[i+1] - \text{reshapePivot}[i]$$

VVC draft 5 specification specifies the carriage of bins between two bounds (a minimum and a maximum respectively known as minBinIdx and maxbinIdx). Out of these bounds, the reconstructed reshaper function represented on a full precision range (e.g. [0-1023] for a 10-bit reshaper function) is specified as clipped toward these bounds.

Step 0: FwdMap Inversion—Uniform FwdMap to Non-Uniform InvMap

A (non-uniformly sampled) inverse mapping function (InvMap) is created from (uniformly sampled) forward mapping function (FwdMap) by swapping coordinates $(x_k, y_k)$ of the pivot points of the forward mapping function and interpolating linearly between these swapped pivot points.

$$\{(x_i, y_i)\}\text{FwdMap} \longrightarrow \{(y_i, x_i)\}\text{InvMap}$$

where $\{(x_i, y_i)\}$ represents a list $\{\ \}$ of pivot points (x,y) coordinates.

It is noted that:
FwdMap is a (piece-wise linear) monotonous (ascending) function so that invertibility is guaranteed
Saturation/clipping in FwdMap implies clipping in InvMap (see Figure below)

Step 1: InvMap Uniformization

Non-uniformly sampled InvMap is uniformized by selecting pivot points of InvMap which are aligned on the sampling grid (plain circles). The problem appears as values which will be interpolated between uniformly sampled pivots points may not be superimposed with values representative of the non-uniformly sampled inverse mapping function. Typically, the faulty pivot point is the one before inverse/forward mapping function saturation to end.

Step 2: Extension/Replacement of a Portion of Curve of Uniformly Sampled InvMap (First Step Involving the Described Aspects)

A pivot point is considered as to be replaced (incriminated pivot point) if it is the last pivot point (abscissa order) of the uniform InvMap or the first pivot point (abscissa order) with the maximum (or minimum for a monotonous decreasing function) ordinate value of the uniform InvMap generated in Step 1.

The incriminated pivot point is replaced by a pivot point located at the intersection between incriminated pivot point abscissa (at uniform sampling abscissa) and the line defined by the two non-uniform InvMap pivots points preceding (abscissa order) the incriminated pivot point (non-uniform InvMap last slope preservation). More generally, the incriminated pivot point is replaced by a pivot point located at the intersection between incriminated pivot point abscissa (at uniform sampling abscissa) and the line defined by any of two (successive or not) non-uniform InvMap pivots points preceding (abscissa order) the incriminated pivot point (non-uniform InvMap last slope preservation). A process example is given as follows:

1) Determine the index of the last FwdMap pivot point idx_end (or second to last in case the last portion of the FwdMap (or InvMap) curve is constant or saturated)

idx_end=FwdMaxBinIdx+1 where FwdMaxBinIdx represents the forward reshaper function last pivot point information transmitted in the bitstream or last bin point to be carried in the bitstream, see VVC draft 5 definition of lmcs_max_bin_idx 2) If this index is less than the maximum number of bins/pivots points that can be carried in the bitstream, then extend InvMap curve using latest slope (or a previous slope) determined between two previous abscissa values of pivot points of the non-uniformly sampled InvMap (or equivalently two ordinate values of the pivot points of the uniformly sampled FwdMap because coordinates of uniform FwdMap and non-uniform InvMap pivot points are swapped versions of each other). Linearly interpolated values greater than a target range (e.g. 1023 for 10-bit reshaping curve) may be clipped.

with FwdReshapePivot representing the pivot points of uniformly sampled FwdMap

The replacing pivot point may be signaled in the syntax the same way the replaced pivot point would have been signaled (but their signaled values are different as their ordinates are different).

InvMaxBinIdx representative of the uniformly sampled inverse reshaper function last, second (or third) to last bin/pivot point carried in the bitstream is computed as follows:

InvMaxBinIdx=FwdMap[idx_end]
    >>log2PwlInvBinLen where log2PwlInvBinLen=log2(reshaperMapSize/reshaperMaxBins) with reshaperMapSize representing the size of FwdMap, InvMap LUT functions (typically 1024) and reshaperMaxBins representing the maximum number of bins or pivots points authorized to represent the mapping function (inverse or forward) (typically 16).

Once InvMap has been extended, the determination of uniformly sampled pivot points representative of the uniformly sampled function InvMap is straightforward:
    for(i=0; i<InvMaxBinIdx+1; i++)
    InvReshapePivot[i]=InvMap(i*pwlInvBinLen)
    where pwlInvBinLen=reshaperMapSize/reshaperMaxBins Possibly, the replacing pivot point ordinate value may be beyond the mapping range or precision range associated to the content (e.g. value=1055 when precision/mapping range is 10-bit i.e. [0; 1023]).

Step 3: Clipping to Replaced Pivot Point Ordinate

In case the replaced pivot point is last pivot point before saturation, the ordinate value of the pivot points following the replaced pivot points is replaced by the ordinate value of the replacing pivot point.

In terms of process this may be written as follows:
    for (i=InvMaxbinIdx+1; i<=reshaperMaxBins; i++)
    InvReshapePivot[i]=invReshapePivot[InvMaxBinIdx+1]

Values which lay in-between these pivots points are clipped as well.

Step 4: Clipping to Uniform FwdMap Range—FwdMap maxBinIdx (Alternative or Option)

Optionally, the ordinate value of the clipping of uniform InvMap is stored or carried. InvMap points located between the pivot point located just before the replacing pivot point and the replacing pivot points are computed thanks to linear interpolation in-between these two points and the result (ordinate value) is clipped by a clipping value so that the

```
X1 = FwdReshapePivot[idx_end]
//Extended/replacing pivot point
X2 = FwdReshapePivot [idx_end] + (FwdReshapePivot [idx_end] −
FwdReshapePivot [idx_end − 1])
X2Clip = Min(Max(0, X2), (1<<BitdepthY )− 1)      //e.g. BitdepthY = 10
Y1 = InvMap[X1]
Y2 = (idx_end + 1) *OrgCW                         //where OrgCW =
(1<<BitdepthY)/16
   if(X2 != X1) // Linear interpolation between replacing pivot point and preceding
pivot point
   {
      scale = (Y2 − Y1) / (X2 − X1)
      for(j = X1+1 ; j<= X2Clip ; j++)
         InvMap[j] = scale*(j − X1) + Y1
   }
   for(i = X2Clip + 1 ; i< lutSize ; i++) // Clipping
      InvMap[i] = InvMap[X2Clip]
``` replaced portion of the curve can be superimposed to the original portion of the inverse mapping function curve. This clipping value may be identified as the second to last or last bin or last pivot point information representative of the forward mapping function (maxBinIdx of the FwdMap uniformly sampled function—FwdMaxBinIdx). maxBinIdx may be determined thanks to reshaper_model_delta_max_bin_idx and/or reshaper_model_min_bin_idx as specified in VVC draft 5 section 7.4.6.4 Luma mapping with chroma scaling data semantics.

This clipping operation may be described as a two-stage process:
i) clipping of the generated non-uniformly sampled function FwdMap on the range of the initial uniformly sampled FwdMap
    for(i=pwlInvBinLen*(FwdMaxBinIdx+1); i<lutSize)
    FwdMap[i]=FwdMap[pwlInvBinLen*(FwdMaxbinIdx+1)]
ii) clipping of the uniformly sampled function InvMap on the mapped range of the FwdMap function
    for(i=FwdMap[pwlInvBinLen*(FwdMaxBinIdx+1)]; i<lutSize; i++)
    InvMap[i]=InvMap[FwdMap[pwlInvBinLen*(FwdMaxBinIdx+1)]]

As a variant, the value for clipping InvMap may be equal to FwdMaxBinIdx*OrgCW where OrgCW=(1<<BitdepthY)/16. OrgCW is representative of the uniform sampling step of the piece-wise linear mapping function.

As a variant, the value for clipping InvMap may be equal to InvMaxBinIdx*OrgCW where OrgCW=(1<<BitdepthY)/16. OrgCW is representative of the uniform sampling step of the piece-wise linear mapping function.

It is noted that step 4 may directly substitute step 3.

Eventually, obtained uniformly sampled inverse mapping function is more compliant with the non-uniformly sampled inverse mapping function.

Syntax/Semantics Adjustments:

Step 3:

In case clipping operation is performed using the value of the replaced pivot point ordinate (i.e. step 3 without step 4), no syntax changes (over VVC draft 5) is required. However, in terms of semantics, reshaper_model_delta_max_bin_idx corresponds to the InvMap maxBinIdx (and not to the FwdMap maxBinIdx).

In case it is authorized that signaled replaced pivot point ordinate value is greater than precision upper bound (e.g 1024 for 10-bit signal) then the following constraint of VVC draft 5 (equation (7-90))

It is a requirement of bitstream conformance that the following condition is true:

$$\Sigma_{i=0}^{15} lcmsCW[i] <= (1 >> BitDepth_Y - 1)$$

is relaxed as follows:
it is removed from the specification text
or (1<<BitDepthY−1) is replaced by another threshold greater than (1<<BitDepthY−1).

For instance, the threshold is set equal to (1<<BitDepthY−1) added with one or one half uniform sampling step. For instance, a uniform sampling step is equal to (1<<BitDepthY)>>4 and BitDepthY=10.

Step 4:

In case the clipping operation to be applied is the one described in step 4 (i.e. using FwdMap maxBinIdx), an additional syntax element representative of this clipping value is to be added in the syntax of the reshaping function. Indeed, when inverse mapping function carriage is selected, its range is carried as well thanks to syntax elements reshaper_model_min_bin_idx and reshaper_model_delta_max_bin_idx, however the forward mapping function maximum range is not transmitted. Clipping described in Step 4 (also applied by the decoder) requires the knowledge of the original range of the uniformly sampled forward mapping function (i.e. maxBinIdx of FwMap). Considering the syntax for carrying inverse mapping functions such as described in prior disclosures, this syntax element can be transmitted as follows:

| | Descriptor |
|---|---|
| tile_group_reshaper_model ( ) { | |
|   reshaper_model_min_bin_idx | ue(v) |
|   reshaper_model_delta_max_bin_idx | ue(v) |
|   reshaper_model_inv_direction_flag | u(1) |
|   if (reshaper_model_inv_direction_flag) | |
|     reshaper_model_fwd_delta_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx; i++ ) { | |
|     reshape_model_bin_delta_abs_CW [ i ] | u(v) |
|     if (reshaper_model_bin_delta_abs_CW[ i ] ) > 0 ) | |
|       reshaper_model_bin_delta_sign_CW_flag[ i ] | u(1) |
|   } | |
| } | | where reshaper_model_fwd_delta_delta_max_bin_idx specifies the delta value between the maximum bin index of the (uniformly sampled) forward MaxBinIdx and the maximum bin index of the inverse MaxBinIdx (this latter being derived from reshaper_model_delta_max_bin_idx when reshaper_model_inv_direction_flag is equal to 1 i.e. when an inverse mapping function is carried rather than a forward mapping function). In that case, the value of the clipping value FwdMaxBinIdx is set equal to 15−reshaper_model_delta_max_bin_idx+reshaper_model_fwd_delta_delta_max_bin_idx.

Possibly, the clipping value may also be directly carried as reshaper_model_fwd_delta_max_bin_idx syntax element where it specifies the difference value between 15 and the maximum bin index of the (uniformly sampled) forward mapping function. In that case, the value of the clipping value FwdMaxBinIdx is set equal to 15−reshaper_model_fwd_delta_max_bin_idx.

Possibly, it is InvMap maxBinIdx which is carried in the additional (compared to state of the art) syntax element proposed above and not FwdMap maxBinIdx. Anyway, Step 4 requires the transport of both InvMap maxBinIdx and FwdMap maxBinIdx.

It is noted that reshaper is also called LMCS (luma mapping with chroma scaling). "Reshape" or "reshaper" word may be substituted with "lmcs" word. MaxBInIdx may also be called ReshaperMaxBinIdx or LmcsMaxBinIdx.

The aspects described improve performance when a mapping function is uniformized, typically when a uniformly sampled (inverse) mapping function is derived from a non-uniformly (inverse) sampled mapping function and/or a uniformly sampled (forward) mapping function.

As an example, using the combination of inverse mapping function extension and the additional clipping syntax element such as described in one of the embodiments of the present document improves significantly the performance on BQSquare sequence from 0.41% to 0.07% penalty.

Figure 17:
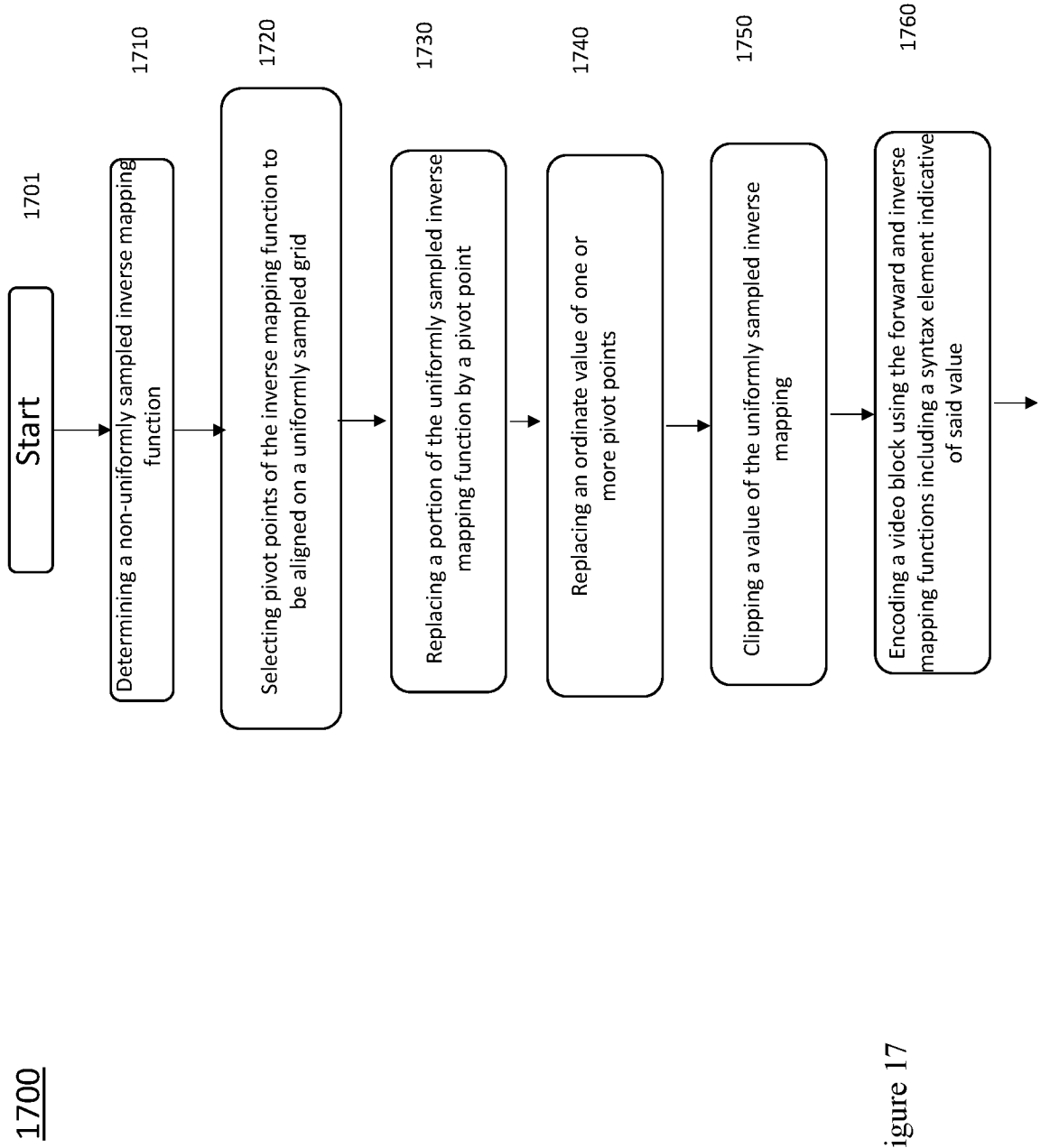
FIG. 17 illustrates one embodiment of an encoding method under the general aspects described.

One embodiment of a method 1700 under the general aspects described here is shown in FIG. 17. The method commences at start block 1701 and control proceeds to block 1710 for determining a non-uniformly sampled inverse mapping function from a uniformly sampled forward mapping function by swapping coordinates of two or more pivot points of the forward mapping function and interpolating points between swapped pivot points. Control proceeds from block 1710 to block 1720 for selecting pivot points of the inverse mapping function to be aligned on a uniformly sampled grid to refine the inverse mapping function. Control proceeds from block 1720 to block 1730 for replacing a portion of the uniformly sampled inverse mapping function by a pivot point located at the intersection between incriminated pivot point abscissa of uniform sampling grid and a line defined by two non-uniform pivots points preceding an incriminated pivot point of a non-uniform last slope preservation. Control proceeds from block 1730 to block 1740 for replacing an ordinate value of one or more pivot points following the replaced pivot point with an ordinate value of the replacing pivot point if the replaced pivot point is a last pivot point before saturation. Control proceeds from block 1740 to block 1750 for clipping a value of the uniformly sampled inverse mapping based on a value. Control proceeds from block 1750 to block 1760 for encoding a video block using the forward and inverse mapping functions including a syntax element indicative of said value.

Figure 18:
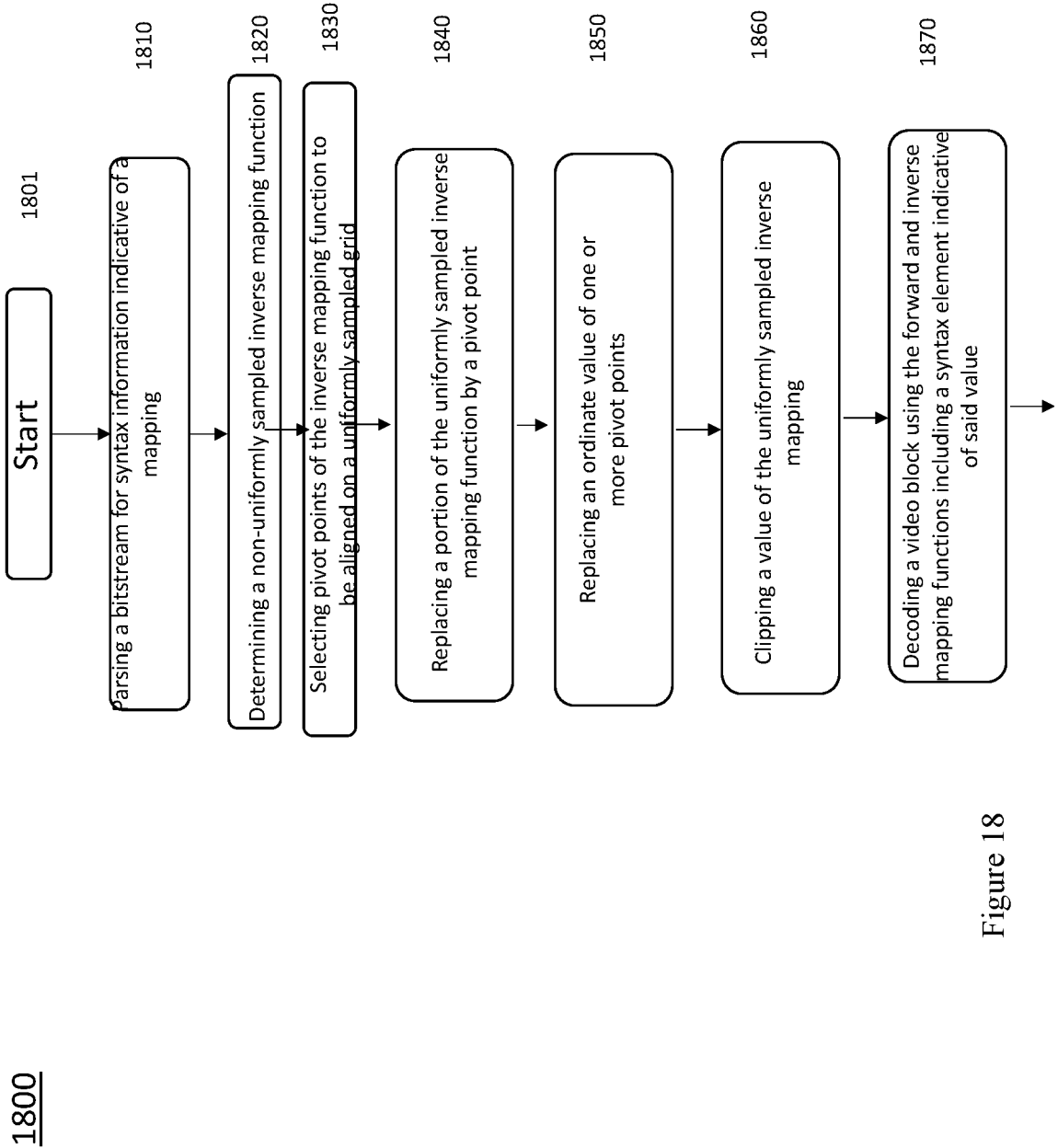
FIG. 18 illustrates one embodiment of a decoding method under the general aspects described.

One embodiment of a method 1800 under the general aspects described here is shown in FIG. 18. The method commences at start block 1801 and control proceeds to block 1810 for parsing a bitstream for syntax information indicative of a mapping function. Control proceeds from block 1810 to block 1820 for determining a non-uniformly sampled inverse mapping function from a uniformly sampled forward mapping function by swapping coordinates of two or more pivot points of the forward mapping function and interpolating points between swapped pivot points. Control proceeds from block 1820 to block 1830 for selecting pivot points of the inverse mapping function to be aligned on a uniformly sampled grid to refine the inverse mapping function. Control proceeds from block 1830 to block 1840 for replacing a portion of the uniformly sampled inverse mapping function by a pivot point located at the intersection between incriminated pivot point abscissa of uniform sampling grid and a line defined by two non-uniform pivots points preceding an incriminated pivot point of a non-uniform last slope preservation. Control proceeds from block 1840 to block 1850 for replacing an ordinate value of one or more pivot points following the replaced pivot point with an ordinate value of the replacing pivot point if the replaced pivot point is a last pivot point before saturation. Control proceeds from block 1850 to block 1860 for clipping a value of the uniformly sampled inverse mapping based on a value. Control proceeds from block 1860 to block 1870 for decoding a video block using the forward and inverse mapping functions based on said syntax information.

FIG. 19 shows one embodiment of an apparatus 1900 for compressing, encoding or decoding video using coding or decoding tools. The apparatus comprises Processor 1910 and can be interconnected to a memory 1920 through at least one port. Both Processor 1910 and memory 1920 can also have one or more additional interconnections to external connections.

Processor 1910 is also configured to either insert or receive information in a bitstream and, either compressing, encoding or decoding using various coding tools.

This application describes a variety of aspects, including tools, features, embodiments, models, approaches, etc. Many of these aspects are described with specificity and, at least to show the individual characteristics, are often described in a manner that may sound limiting. However, this is for purposes of clarity in description, and does not limit the application or scope of those aspects. Indeed, all of the different aspects can be combined and interchanged to provide further aspects. Moreover, the aspects can be combined and interchanged with aspects described in earlier filings as well.

Figure 6:
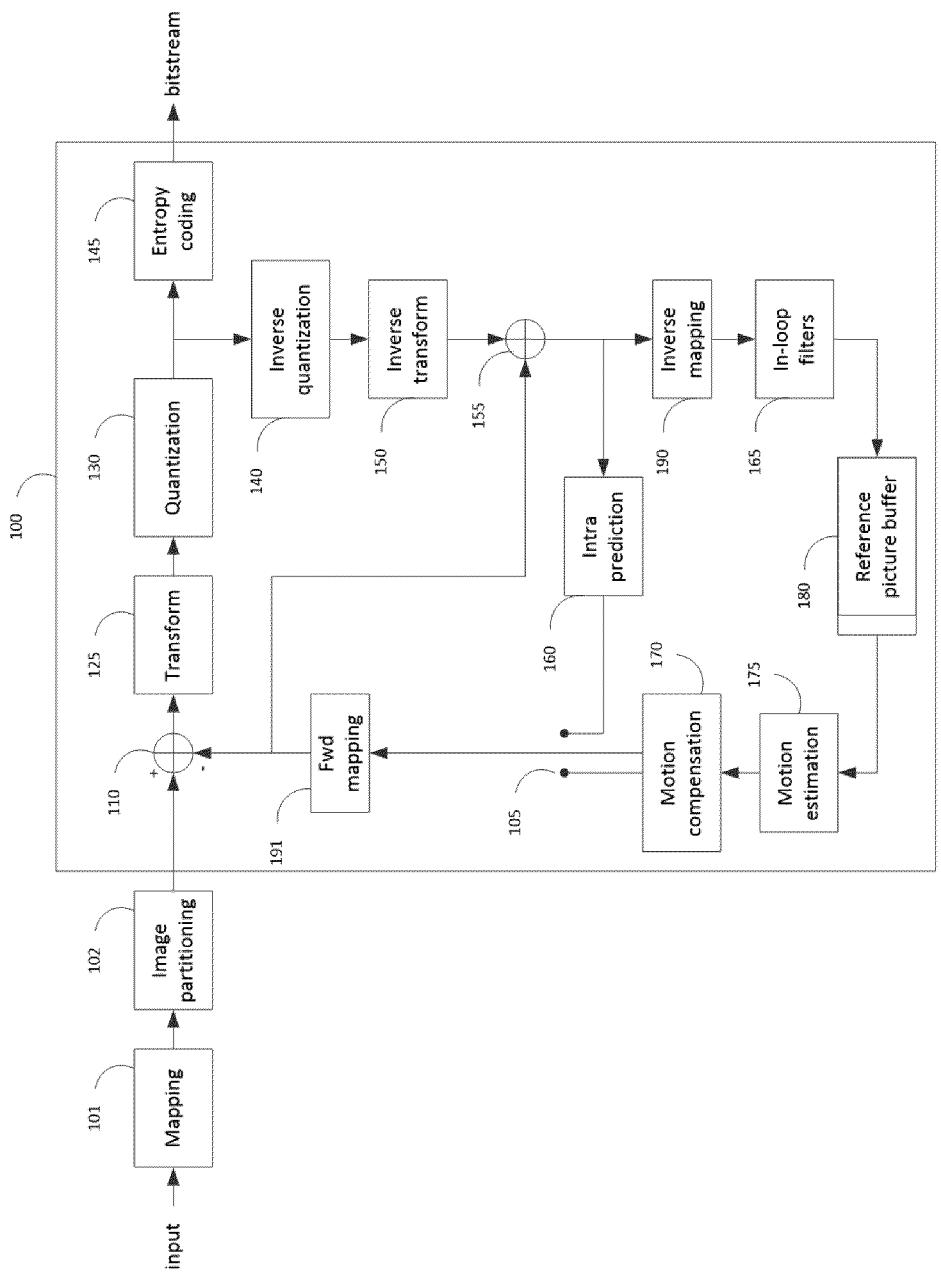
FIG. 6 illustrates a generic video compression scheme.
Figure 7:
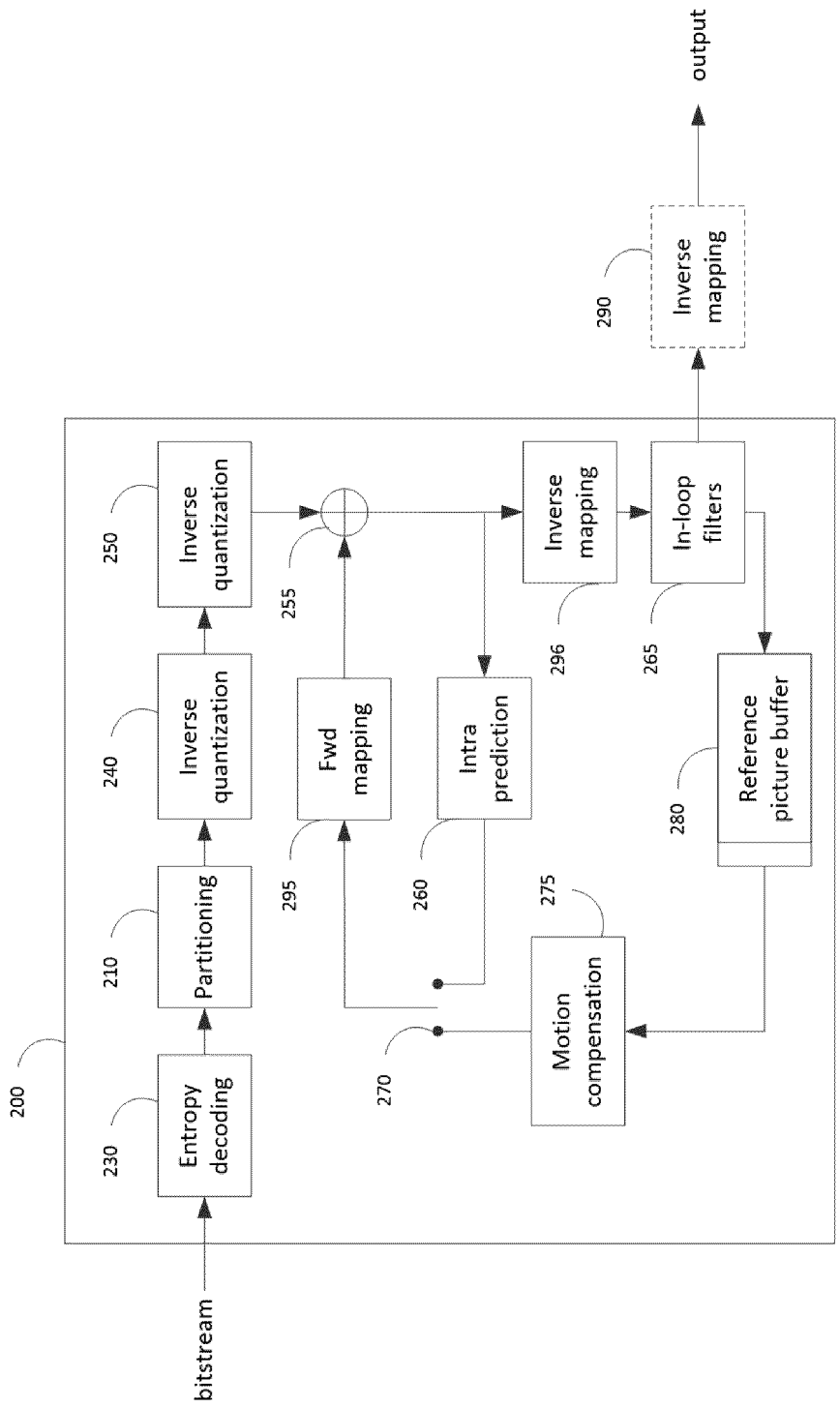
FIG. 7 illustrates a generic video decompression scheme.
Figure 8:
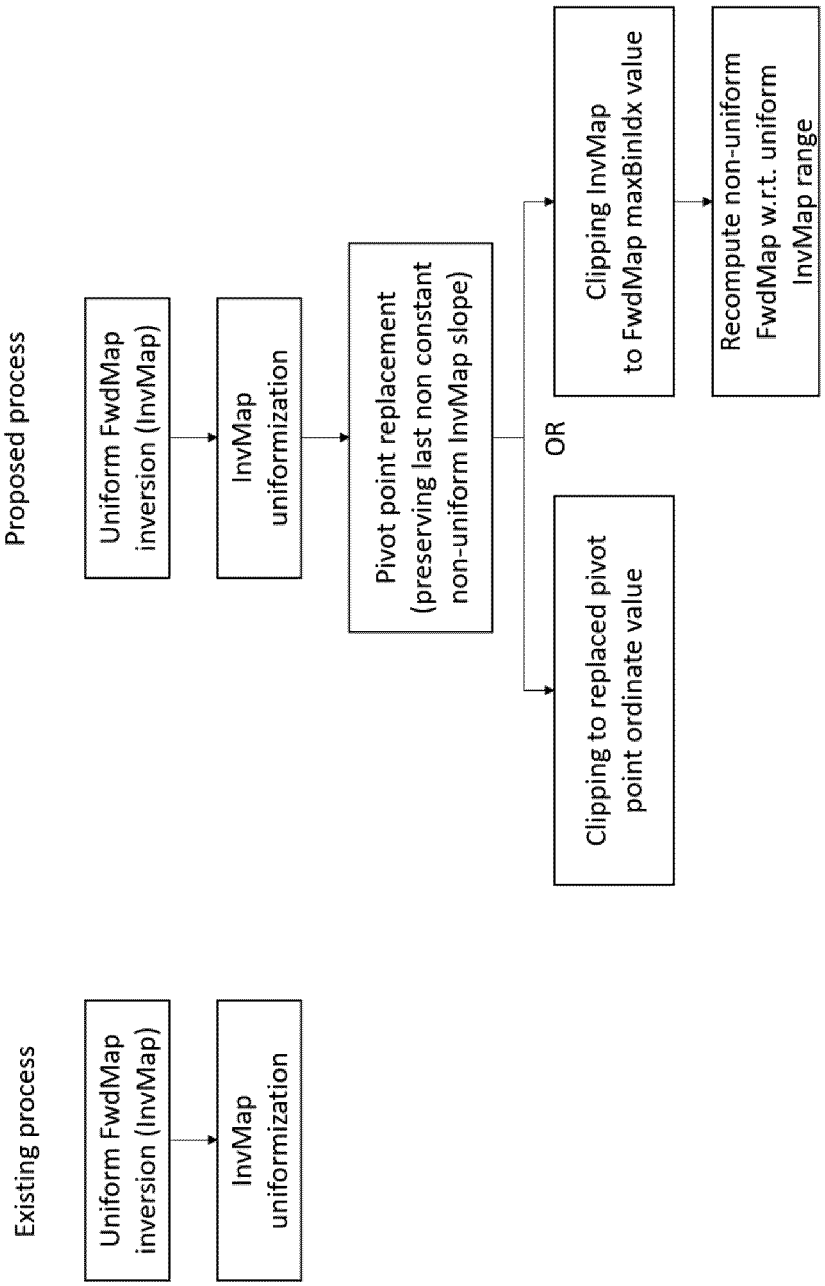
FIG. 8 illustrates a flowchart of the state of the art against the proposition.
Figure 9:
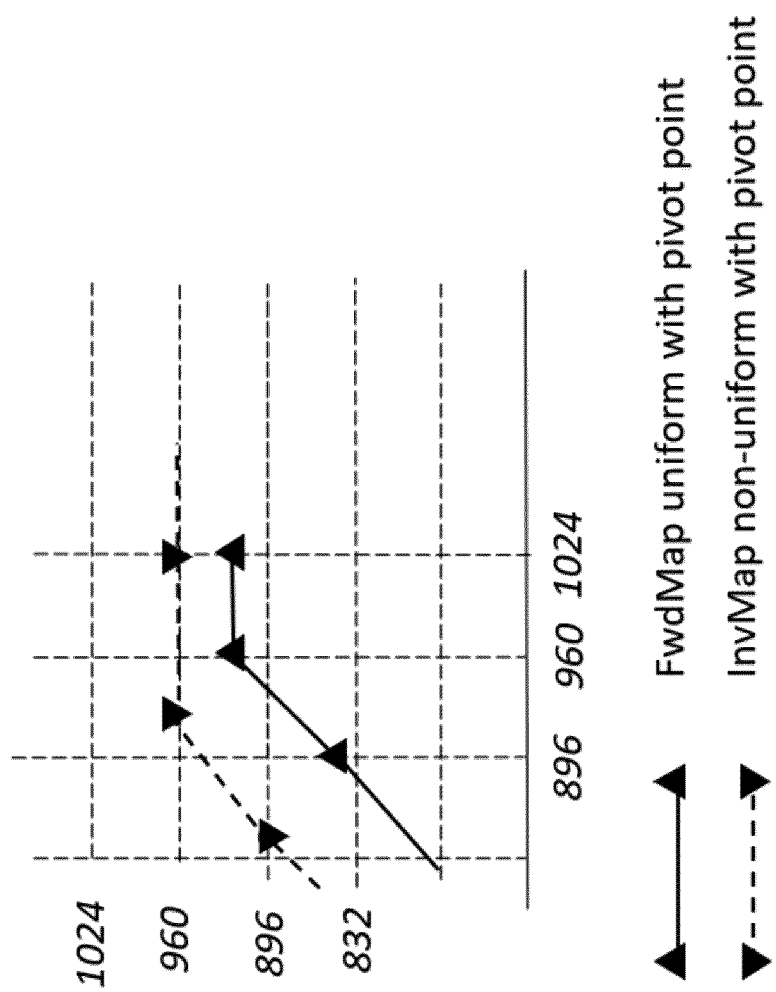
FIG. 9 illustrates Step 0—FwdMap inversion (non-uniformly sampled InvMap).
Figure 10:
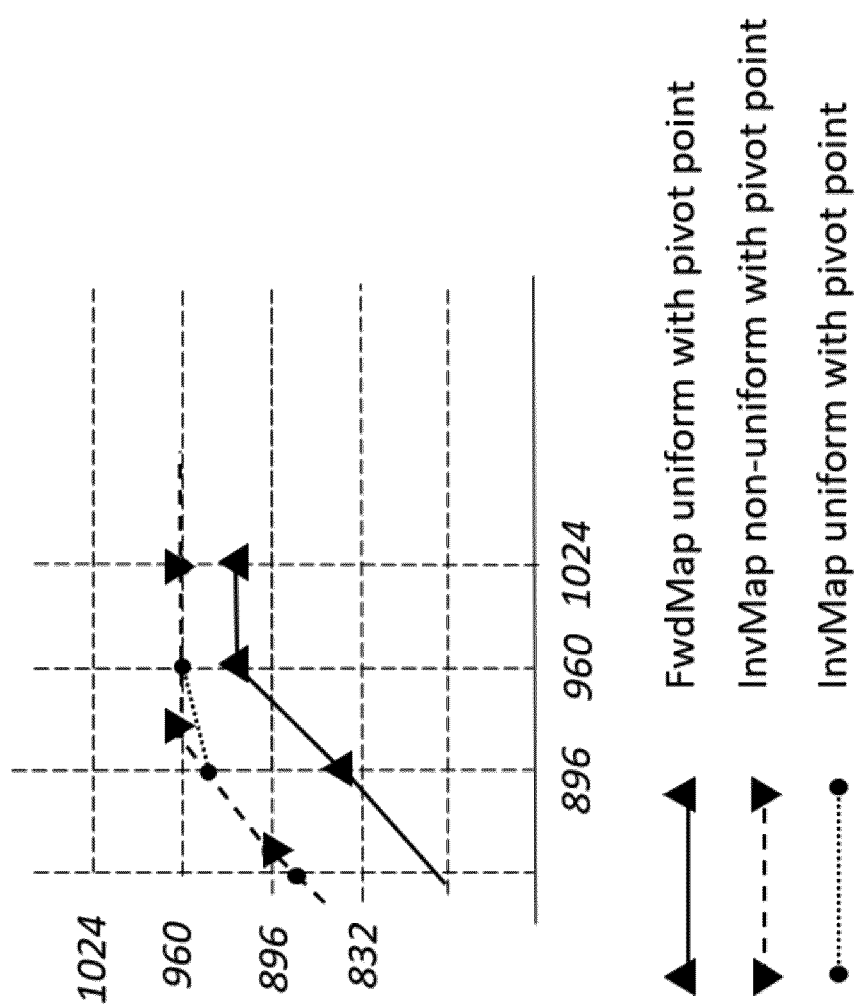
FIG. 10 illustrates Step 1—InvMap uniformization.
Figure 11:
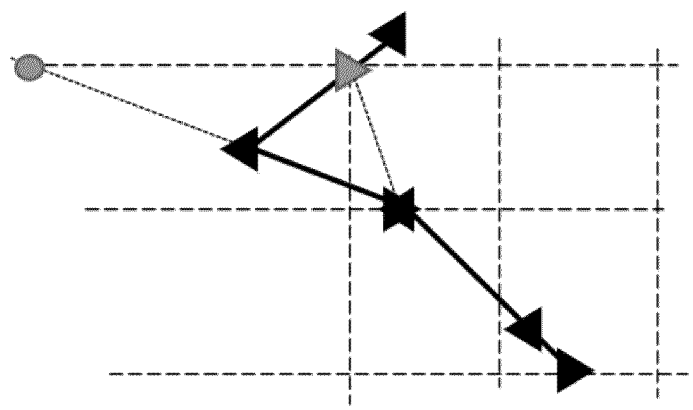
FIG. 11 illustrates Step 2—Pivot point replacement (alternative scheme).
Figure 12:
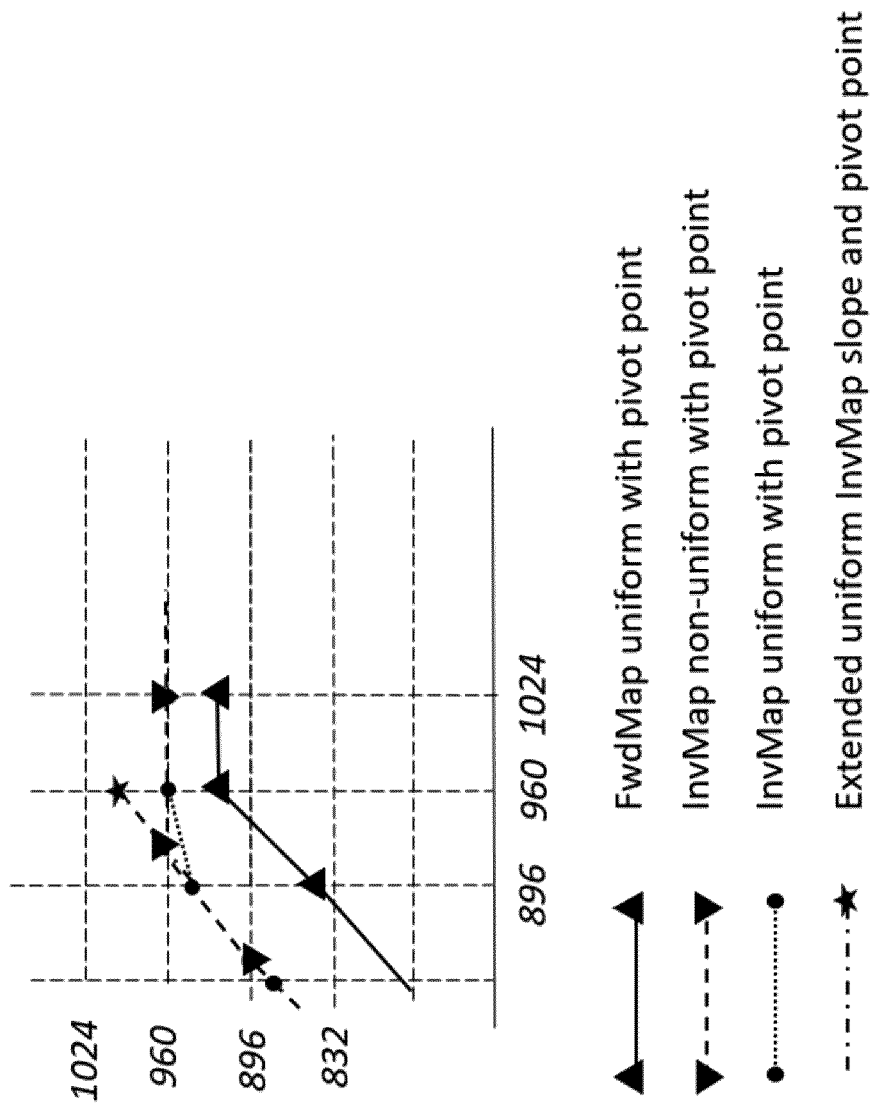
FIG. 12 illustrates Step 2—InvMap slope extension.
Figure 13:
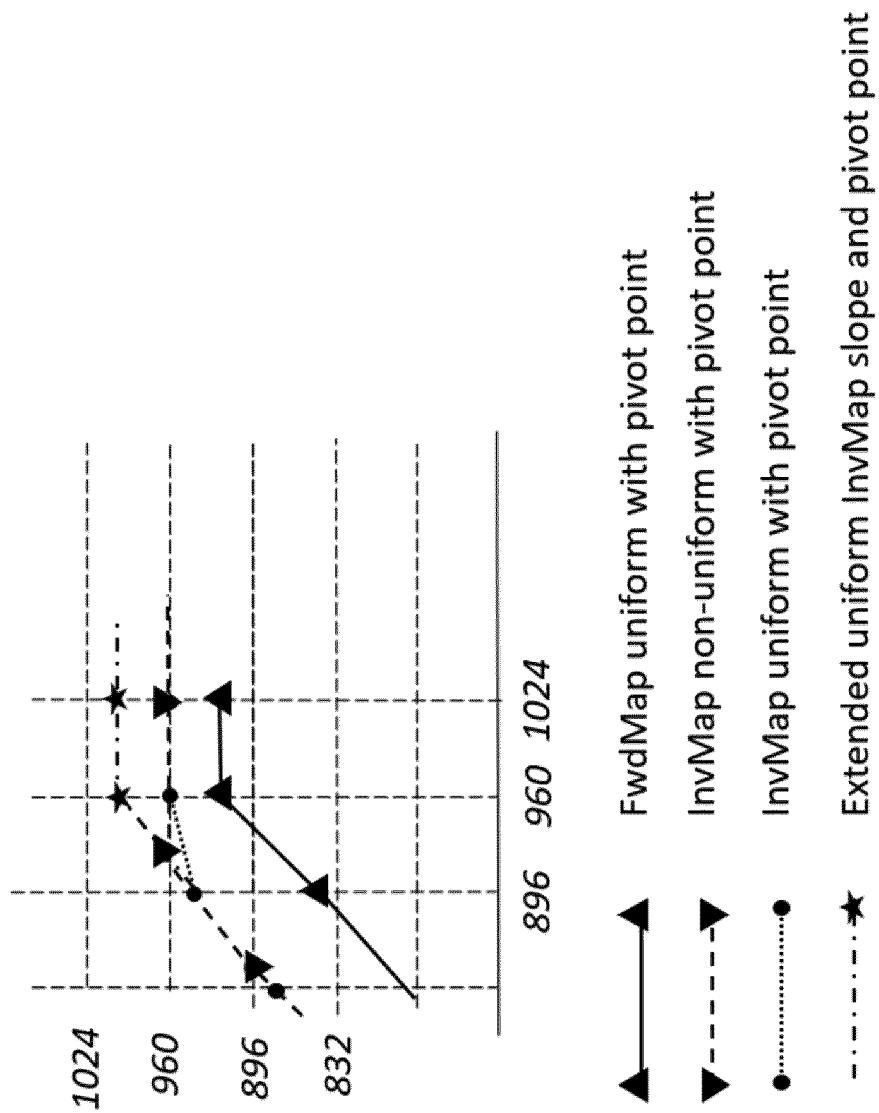
FIG. 13 illustrates Step 3—Saturation.
Figure 14:
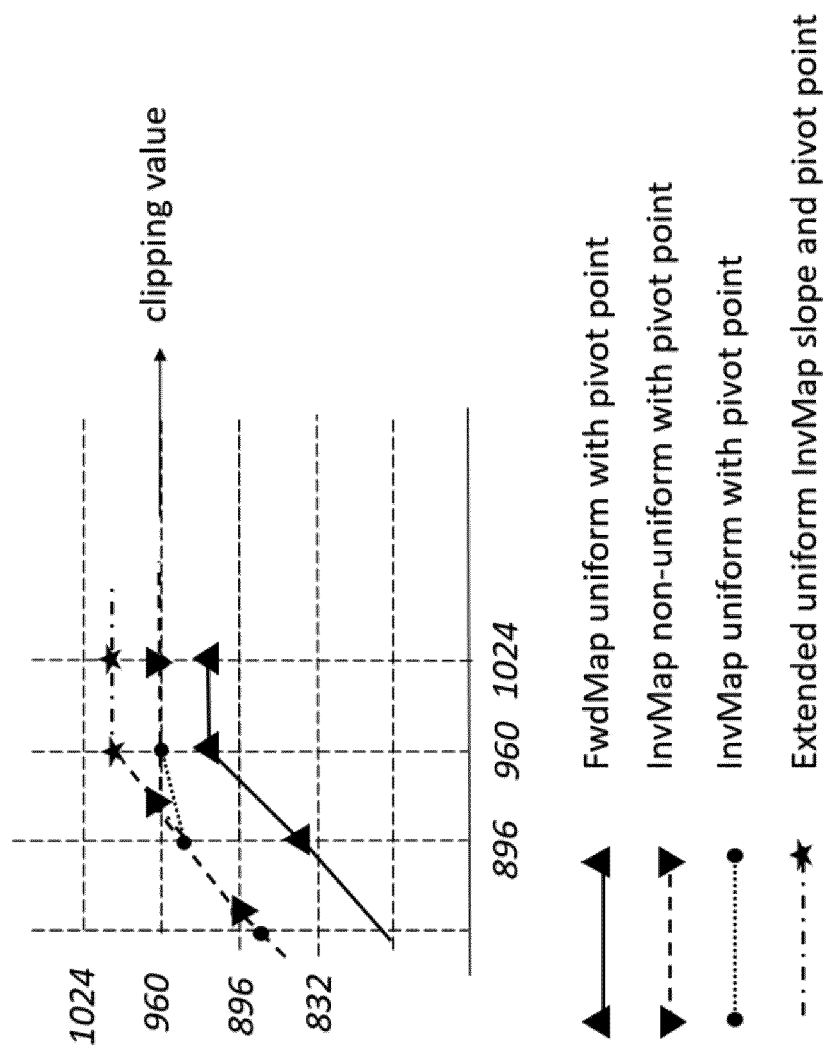
FIG. 14 illustrates Step 4—Clipping according to InvMap original range.
Figure 15:
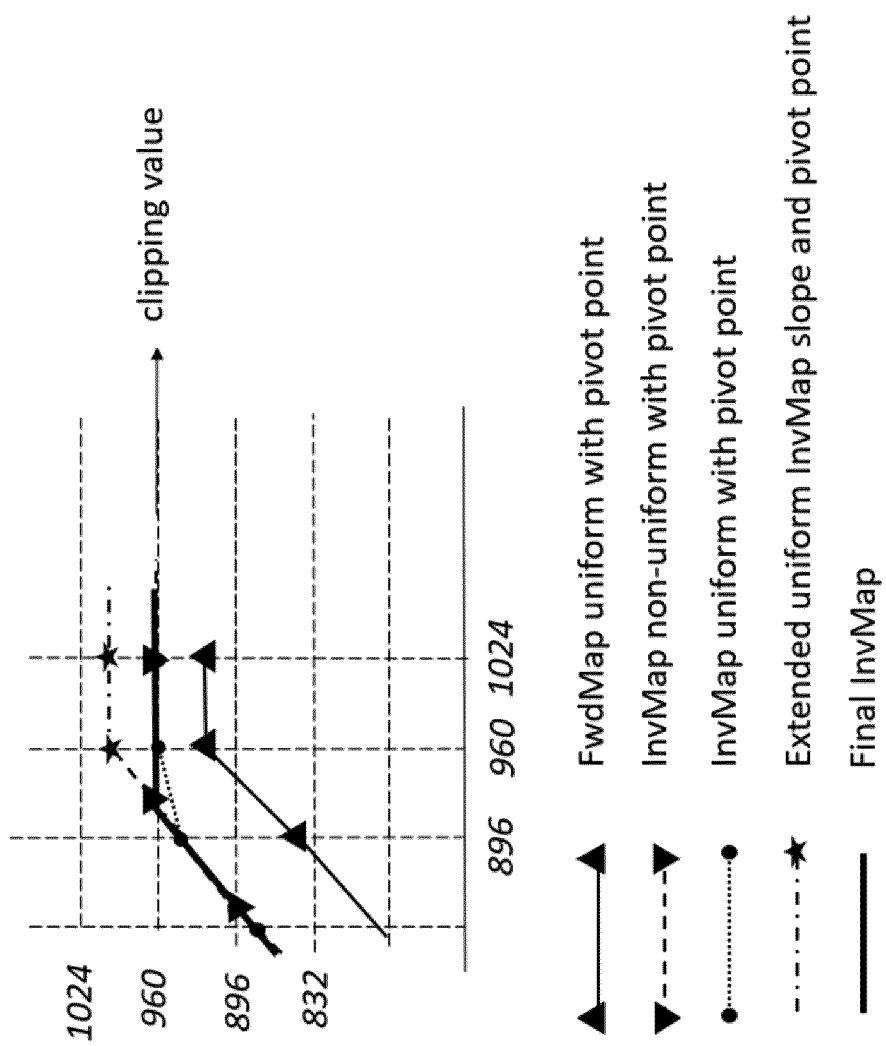
FIG. 15 illustrates Final InvMap.
Figure 16:
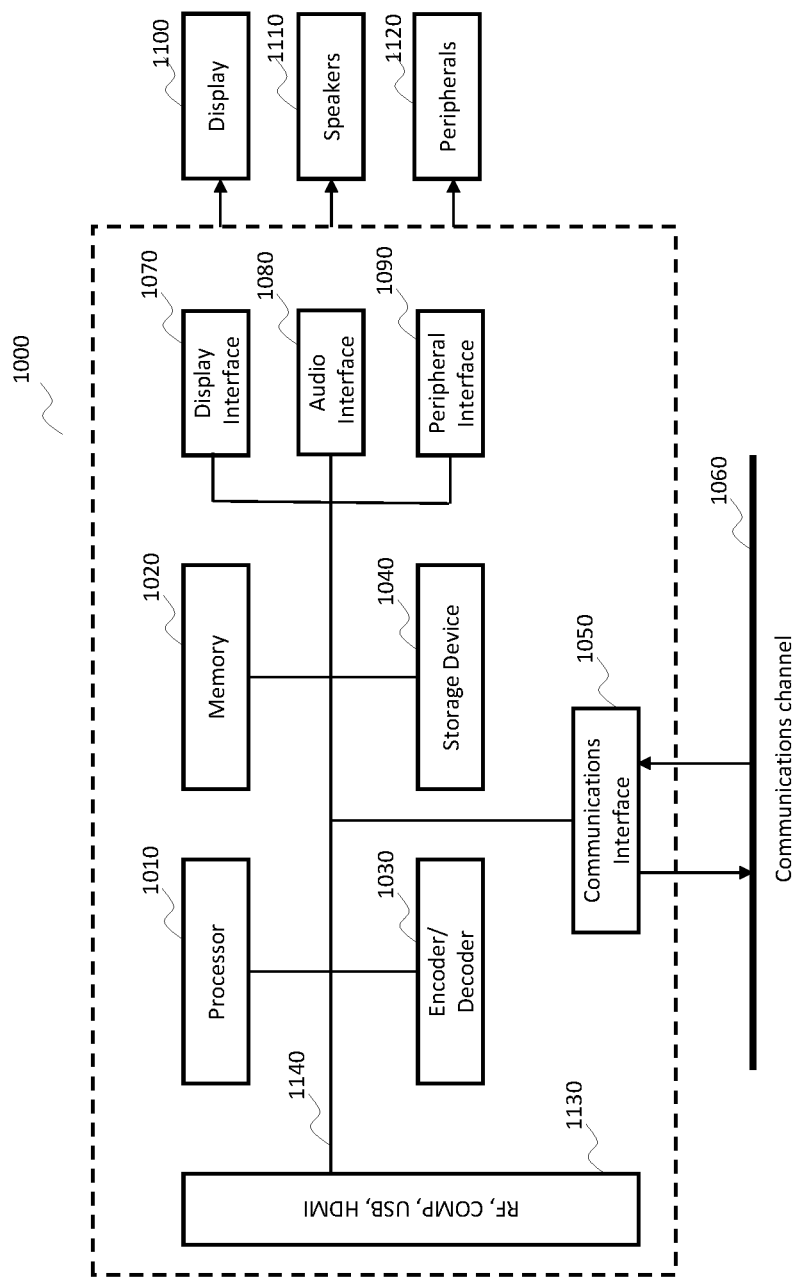
FIG. 16 illustrates one embodiment of an apparatus for encoding or decoding video using mapping or inverse mapping.

The aspects described and contemplated in this application can be implemented in many different forms. FIGS. 6, 7 and 16 provide some embodiments, but other embodiments are contemplated and the discussion of FIGS. 6, 7 and 16 does not limit the breadth of the implementations. At least one of the aspects generally relates to video encoding and decoding, and at least one other aspect generally relates to transmitting a bitstream generated or encoded. These and other aspects can be implemented as a method, an apparatus, a computer readable storage medium having stored thereon instructions for encoding or decoding video data according to any of the methods described, and/or a computer readable storage medium having stored thereon a bitstream generated according to any of the methods described.

In the present application, the terms "reconstructed" and "decoded" may be used interchangeably, the terms "pixel" and "sample" may be used interchangeably, the terms "image," "picture" and "frame" may be used interchangeably. Usually, but not necessarily, the term "reconstructed" is used at the encoder side while "decoded" is used at the decoder side.

Various methods are described herein, and each of the methods comprises one or more steps or actions for achieving the described method. Unless a specific order of steps or actions is required for proper operation of the method, the order and/or use of specific steps and/or actions may be modified or combined.

Various methods and other aspects described in this application can be used to modify modules, for example, the intra prediction, entropy coding, and/or decoding modules (160, 360, 145, 330), of a video encoder 100 and decoder 200 as shown in FIG. 6 and FIG. 7. Moreover, the present aspects are not limited to VVC or HEVC, and can be applied, for example, to other standards and recommendations, whether pre-existing or future-developed, and extensions of any such standards and recommendations (including VVC and HEVC). Unless indicated otherwise, or technically precluded, the aspects described in this application can be used individually or in combination.

Various numeric values are used in the present application. The specific values are for example purposes and the aspects described are not limited to these specific values.

FIG. 6 illustrates an encoder 100. Variations of this encoder 100 are contemplated, but the encoder 100 is described below for purposes of clarity without describing all expected variations.

Before being encoded, the video sequence may go through pre-encoding processing (101), for example, applying a color transform to the input color picture (e.g., conversion from RGB 4:4:4 to YCbCr 4:2:0), or performing a remapping of the input picture components in order to get a signal distribution more resilient to compression (for instance using a histogram equalization of one of the color components). Metadata can be associated with the pre-processing and attached to the bitstream.

In the encoder 100, a picture is encoded by the encoder elements as described below. The picture to be encoded is partitioned (102) and processed in units of, for example, CUs. Each unit is encoded using, for example, either an intra or inter mode. When a unit is encoded in an intra mode, it performs intra prediction (160). In an inter mode, motion estimation (175) and compensation (170) are performed. The encoder decides (105) which one of the intra mode or inter mode to use for encoding the unit, and indicates the intra/inter decision by, for example, a prediction mode flag. Prediction residuals are calculated, for example, by subtracting (110) the predicted block from the original image block.

The prediction residuals are then transformed (125) and quantized (130). The quantized transform coefficients, as well as motion vectors and other syntax elements, are entropy coded (145) to output a bitstream. The encoder can skip the transform and apply quantization directly to the non-transformed residual signal. The encoder can bypass both transform and quantization, i.e., the residual is coded directly without the application of the transform or quantization processes.

The encoder decodes an encoded block to provide a reference for further predictions. The quantized transform coefficients are de-quantized (140) and inverse transformed (150) to decode prediction residuals. Combining (155) the decoded prediction residuals and the predicted block, an image block is reconstructed. In-loop filters (165) are applied to the reconstructed picture to perform, for example, deblocking/SAO (Sample Adaptive Offset) filtering to reduce encoding artifacts. The filtered image is stored at a reference picture buffer (180).

FIG. 7 illustrates a block diagram of a video decoder 200. In the decoder 200, a bitstream is decoded by the decoder elements as described below. Video decoder 200 generally performs a decoding pass reciprocal to the encoding pass as described in FIG. 6. The encoder 100 also generally performs video decoding as part of encoding video data.

In particular, the input of the decoder includes a video bitstream, which can be generated by video encoder 100. The bitstream is first entropy decoded (230) to obtain transform coefficients, motion vectors, and other coded information. The picture partition information indicates how the picture is partitioned. The decoder may therefore divide (235) the picture according to the decoded picture partitioning information. The transform coefficients are de-quantized (240) and inverse transformed (250) to decode the prediction residuals. Combining (255) the decoded prediction residuals and the predicted block, an image block is reconstructed. The predicted block can be obtained (270) from intra prediction (260) or motion-compensated prediction (i.e., inter prediction) (275). In-loop filters (265) are applied to the reconstructed image. The filtered image is stored at a reference picture buffer (280).

The decoded picture can further go through post-decoding processing (285), for example, an inverse color transform (e.g. conversion from YCbCr 4:2:0 to RGB 4:4:4) or an inverse remapping performing the inverse of the remapping process performed in the pre-encoding processing (101). The post-decoding processing can use metadata derived in the pre-encoding processing and signaled in the bitstream.

FIG. 16 illustrates a block diagram of an example of a system in which various aspects and embodiments are implemented. System 1000 can be embodied as a device including the various components described below and is configured to perform one or more of the aspects described in this document. Examples of such devices, include, but are not limited to, various electronic devices such as personal computers, laptop computers, smartphones, tablet computers, digital multimedia set top boxes, digital television receivers, personal video recording systems, connected home appliances, and servers. Elements of system 1000, singly or in combination, can be embodied in a single integrated circuit (IC), multiple ICs, and/or discrete components. For example, in at least one embodiment, the processing and encoder/decoder elements of system 1000 are distributed across multiple ICs and/or discrete components. In various embodiments, the system 1000 is communicatively coupled to one or more other systems, or other electronic devices, via, for example, a communications bus or through dedicated input and/or output ports. In various embodiments, the system 1000 is configured to implement one or more of the aspects described in this document.

The system 1000 includes at least one processor 1010 configured to execute instructions loaded therein for implementing, for example, the various aspects described in this document. Processor 1010 can include embedded memory, input output interface, and various other circuitries as known in the art. The system 1000 includes at least one memory 1020 (e.g., a volatile memory device, and/or a non-volatile memory device). System 1000 includes a storage device 1040, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random Access Memory (DRAM), Static Random Access Memory (SRAM), flash, magnetic disk drive, and/or optical disk drive. The storage device 1040 can include an internal storage device, an attached storage device (including detachable and non-detachable storage devices), and/or a network accessible storage device, as non-limiting examples.

System 1000 includes an encoder/decoder module 1030 configured, for example, to process data to provide an encoded video or decoded video, and the encoder/decoder module 1030 can include its own processor and memory. The encoder/decoder module 1030 represents module(s) that can be included in a device to perform the encoding and/or decoding functions. As is known, a device can include one or both of the encoding and decoding modules. Additionally, encoder/decoder module 1030 can be implemented as a separate element of system 1000 or can be incorporated within processor 1010 as a combination of hardware and software as known to those skilled in the art.

Program code to be loaded onto processor 1010 or encoder/decoder 1030 to perform the various aspects described in this document can be stored in storage device 1040 and subsequently loaded onto memory 1020 for execution by processor 1010. In accordance with various embodiments, one or more of processor 1010, memory 1020, storage device 1040, and encoder/decoder module 1030 can store one or more of various items during the performance of the processes described in this document. Such stored items can include, but are not limited to, the input video, the decoded video or portions of the decoded video, the bitstream, matrices, variables, and intermediate or final results from the processing of equations, formulas, operations, and operational logic.

In some embodiments, memory inside of the processor 1010 and/or the encoder/decoder module 1030 is used to store instructions and to provide working memory for processing that is needed during encoding or decoding. In other embodiments, however, a memory external to the processing device (for example, the processing device can be either the processor 1010 or the encoder/decoder module 1030) is used for one or more of these functions. The external memory can be the memory 1020 and/or the storage device 1040, for example, a dynamic volatile memory and/or a non-volatile flash memory. In several embodiments, an external non-volatile flash memory is used to store the operating system of, for example, a television. In at least one embodiment, a fast external dynamic volatile memory such as a RAM is used as working memory for video coding and decoding operations, such as for MPEG-2 (MPEG refers to the Moving Picture Experts Group, MPEG-2 is also referred to as ISO/IEC 13818, and 13818-1 is also known as H.222, and 13818-2 is also known as H.262), HEVC (HEVC refers to High Efficiency Video Coding, also known as H.265 and MPEG-H Part 2), or VVC (Versatile Video Coding, a new standard being developed by JVET, the Joint Video Experts Team).

The input to the elements of system 1000 can be provided through various input devices as indicated in block 1130. Such input devices include, but are not limited to, (i) a radio frequency (RF) portion that receives an RF signal transmitted, for example, over the air by a broadcaster, (ii) a Component (COMP) input terminal (or a set of COMP input terminals), (iii) a Universal Serial Bus (USB) input terminal, and/or (iv) a High Definition Multimedia Interface (HDMI) input terminal. Other examples, not shown in FIG. 16, include composite video.

In various embodiments, the input devices of block 1130 have associated respective input processing elements as known in the art. For example, the RF portion can be associated with elements suitable for (i) selecting a desired frequency (also referred to as selecting a signal, or band-limiting a signal to a band of frequencies), (ii) downconverting the selected signal, (iii) band-limiting again to a narrower band of frequencies to select (for example) a signal frequency band which can be referred to as a channel in certain embodiments, (iv) demodulating the downconverted and band-limited signal, (v) performing error correction, and (vi) demultiplexing to select the desired stream of data packets. The RF portion of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, downconverting the received signal to a lower frequency (for example, an intermediate frequency or a near-baseband frequency) or to baseband. In one set-top box embodiment, the RF portion and its associated input processing element receives an RF signal transmitted over a wired (for example, cable) medium, and performs frequency selection by filtering, downconverting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF portion includes an antenna.

Additionally, the USB and/or HDMI terminals can include respective interface processors for connecting system 1000 to other electronic devices across USB and/or HDMI connections. It is to be understood that various aspects of input processing, for example, Reed-Solomon error correction, can be implemented, for example, within a separate input processing IC or within processor 1010 as necessary. Similarly, aspects of USB or HDMI interface processing can be implemented within separate interface ICs or within processor 1010 as necessary. The demodulated, error corrected, and demultiplexed stream is provided to various processing elements, including, for example, processor 1010, and encoder/decoder 1030 operating in combination with the memory and storage elements to process the datastream as necessary for presentation on an output device.

Various elements of system 1000 can be provided within an integrated housing, Within the integrated housing, the various elements can be interconnected and transmit data therebetween using suitable connection arrangement, for example, an internal bus as known in the art, including the Inter-IC (I2C) bus, wiring, and printed circuit boards.

The system 1000 includes communication interface 1050 that enables communication with other devices via communication channel 1060. The communication interface 1050 can include, but is not limited to, a transceiver configured to transmit and to receive data over communication channel 1060. The communication interface 1050 can include, but is not limited to, a modem or network card and the communication channel 1060 can be implemented, for example, within a wired and/or a wireless medium.

Data is streamed, or otherwise provided, to the system 1000, in various embodiments, using a wireless network such as a Wi-Fi network, for example IEEE 802.11 (IEEE refers to the Institute of Electrical and Electronics Engineers). The Wi-Fi signal of these embodiments is received over the communications channel 1060 and the communications interface 1050 which are adapted for Wi-Fi communications. The communications channel 1060 of these embodiments is typically connected to an access point or router that provides access to external networks including the Internet for allowing streaming applications and other over-the-top communications. Other embodiments provide streamed data to the system 1000 using a set-top box that delivers the data over the HDMI connection of the input block 1130. Still other embodiments provide streamed data to the system 1000 using the RF connection of the input block 1130. As indicated above, various embodiments provide data in a non-streaming manner. Additionally, various embodiments use wireless networks other than Wi-Fi, for example a cellular network or a Bluetooth network.

The system 1000 can provide an output signal to various output devices, including a display 1100, speakers 1110, and other peripheral devices 1120. The display 1100 of various embodiments includes one or more of, for example, a touchscreen display, an organic light-emitting diode (OLED) display, a curved display, and/or a foldable display. The display 1100 can be for a television, a tablet, a laptop, a cell phone (mobile phone), or other device. The display 1100 can also be integrated with other components (for example, as in a smart phone), or separate (for example, an external monitor fora laptop). The other peripheral devices 1120 include, in various examples of embodiments, one or more of a stand-alone digital video disc (or digital versatile disc) (DVR, for both terms), a disk player, a stereo system, and/or a lighting system. Various embodiments use one or more peripheral devices 1120 that provide a function based on the output of the system 1000. For example, a disk player performs the function of playing the output of the system 1000.

In various embodiments, control signals are communicated between the system 1000 and the display 1100, speakers 1110, or other peripheral devices 1120 using signaling such as AV.Link, Consumer Electronics Control (CEC), or other communications protocols that enable device-to-device control with or without user intervention. The output devices can be communicatively coupled to system 1000 via dedicated connections through respective interfaces 1070, 1080, and 1090. Alternatively, the output devices can be connected to system 1000 using the communications channel 1060 via the communications interface 1050. The display 1100 and speakers 1110 can be integrated in a single unit with the other components of system 1000 in an electronic device such as, for example, a television. In various embodiments, the display interface 1070 includes a display driver, such as, for example, a timing controller (T Con) chip.

The display 1100 and speaker 1110 can alternatively be separate from one or more of the other components, for example, if the RF portion of input 1130 is part of a separate set-top box. In various embodiments in which the display 1100 and speakers 1110 are external components, the output signal can be provided via dedicated output connections, including, for example, HDMI ports, USB ports, or COMP outputs.

The embodiments can be carried out by computer software implemented by the processor 1010 or by hardware, or by a combination of hardware and software. As a non-limiting example, the embodiments can be implemented by one or more integrated circuits. The memory 1020 can be of any type appropriate to the technical environment and can be implemented using any appropriate data storage technology, such as optical memory devices, magnetic memory devices, semiconductor-based memory devices, fixed memory, and removable memory, as non-limiting examples. The processor 1010 can be of any type appropriate to the technical environment, and can encompass one or more of microprocessors, general purpose computers, special purpose computers, and processors based on a multi-core architecture, as non-limiting examples.

Various implementations involve decoding. "Decoding", as used in this application, can encompass all or part of the processes performed, for example, on a received encoded sequence to produce a final output suitable for display. In various embodiments, such processes include one or more of the processes typically performed by a decoder, for example, entropy decoding, inverse quantization, inverse transformation, and differential decoding. In various embodiments, such processes also, or alternatively, include processes performed by a decoder of various implementations described in this application.

As further examples, in one embodiment "decoding" refers only to entropy decoding, in another embodiment "decoding" refers only to differential decoding, and in another embodiment "decoding" refers to a combination of entropy decoding and differential decoding. Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence to produce an encoded bitstream. In various embodiments, such processes include one or more of the processes typically performed by an encoder, for example, partitioning, differential encoding, transformation, quantization, and entropy encoding. In various embodiments, such processes also, or alternatively, include processes performed by an encoder of various implementations described in this application.

As further examples, in one embodiment "encoding" refers only to entropy encoding, in another embodiment "encoding" refers only to differential encoding, and in another embodiment "encoding" refers to a combination of differential encoding and entropy encoding. Whether the phrase "encoding process" is intended to refer specifically to a subset of operations or generally to the broader encoding process will be clear based on the context of the specific descriptions and is believed to be well understood by those skilled in the art.

Note that the syntax elements as used herein are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments may refer to parametric models or rate distortion optimization. In particular, during the encoding process, the balance or trade-off between the rate and distortion is usually considered, often given the constraints of computational complexity. It can be measured through a Rate Distortion Optimization (RDO) metric, or through Least Mean Square (LMS), Mean of Absolute Errors (MAE), or other such measurements. Rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of the reconstructed signal after coding and decoding. Faster approaches may also be used, to save encoding complexity, in particular with computation of an approximated distortion based on the prediction or the prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented in, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment.

Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals a particular one of a plurality of transforms, coding modes or flags. In this way, in an embodiment the same transform, parameter, or mode is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the bitstream of a described embodiment. Such a signal can be formatted, for example, as an electromagnetic wave (for example, using a radio frequency portion of spectrum) or as a baseband signal. The formatting can include, for example, encoding a data stream and modulating a carrier with the encoded data stream. The information that the signal carries can be, for example, analog or digital information. The signal can be transmitted over a variety of different wired or wireless links, as is known. The signal can be stored on a processor-readable medium.

We describe a number of embodiments, across various claim categories and types. Features of these embodiments can be provided alone or in any combination. Further, embodiments can include one or more of the following features, devices, or aspects, alone or in any combination, across various claim categories and types:

- A bitstream or signal that includes one or more of the described syntax elements, or variations thereof.
- A bitstream or signal that includes syntax conveying information generated according to any of the embodiments described.
- Creating and/or transmitting and/or receiving and/or decoding according to any of the embodiments described.
- A method, process, apparatus, medium storing instructions, medium storing data, or signal according to any of the embodiments described.
- Inserting in the signaling syntax elements that enable the decoder to determine coding mode in a manner corresponding to that used by an encoder.
- Creating and/or transmitting and/or receiving and/or decoding a bitstream or signal that includes one or more of the described syntax elements, or variations thereof.
- A TV, set-top box, cell phone, tablet, or other electronic device that performs transform method(s) according to any of the embodiments described.
- A TV, set-top box, cell phone, tablet, or other electronic device that performs transform method(s) determination according to any of the embodiments described, and that displays (e.g. using a monitor, screen, or other type of display) a resulting image.
- A TV, set-top box, cell phone, tablet, or other electronic device that selects, bandlimits, or tunes (e.g. using a tuner) a channel to receive a signal including an encoded image, and performs transform method(s) according to any of the embodiments described.
- A TV, set-top box, cell phone, tablet, or other electronic device that receives (e.g. using an antenna) a signal over the air that includes an encoded image, and performs transform method(s).

The invention claimed is:

1. A method, comprising:
   determining a non-uniformly sampled inverse mapping function from a uniformly sampled forward mapping function by swapping coordinates of two or more pivot points of the uniformly sampled forward mapping function and interpolating points between swapped pivot points;

selecting pivot points of the non-uniformly sampled inverse mapping function to be aligned on a uniformly sampled grid to refine the non-uniformly sampled inverse mapping function;

replacing a portion of a uniformly sampled inverse mapping function by a pivot point located at the intersection between replaced pivot point abscissa of uniformly sampled grid and a line defined by two non-uniform pivot points preceding a replaced pivot point of a non-uniform last slope preservation;

replacing an ordinate value of one or more pivot points following the replaced pivot point with an ordinate value of the replacing pivot point if the replaced pivot point is a last pivot point before saturation;

clipping a sample of the uniformly sampled inverse mapping function based on a clipping value; and encoding a video block using the uniformly sampled forward mapping function, the non-uniformly sampled inverse mapping function, and the uniformly sampled inverse mapping function including a syntax element indicative of said clipping value.

2. The method of claim 1, wherein the replaced pivot point is second to last when a last portion of the uniformly sampled forward mapping function, or the non-uniformly sampled inverse mapping function, curve is constant.

3. The method of claim 1, wherein clipping is performed for values greater than a target range.

4. The method of claim 3, wherein the target range is 1023 for 10-bit reshaping curve.

5. The method of claim 1, wherein the non-uniformly sampled inverse mapping function is extended using a previous slope.

6. The method of claim 1, wherein the value for clipping the inverse mapping function may be equal to FwdMaxBinIdx*OrgCW where OrgCW is representative of a uniform sampling step of a piece-wise linear mapping function, where FwdMaxBinIdx represents the forward reshaper function last pivot point information transmitted in the bitstream or last bin point to be carried in the bitstream.

7. The method of claim 1, wherein a syntax element specifies a delta value between a maximum bin indices of a uniformly sampled forward mapping function and the non-uniformly sampled inverse mapping function.

8. An apparatus, comprising:
a processor, configured to perform:
determining a non-uniformly sampled inverse mapping function from a uniformly sampled forward mapping function by swapping coordinates of two or more pivot points of the uniformly sampled forward mapping function and interpolating points between swapped pivot points;

selecting pivot points of the non-uniformly sampled inverse mapping function to be aligned on a uniformly sampled grid to refine the non-uniformly sampled inverse mapping function;

replacing a portion of a uniformly sampled inverse mapping function by a pivot point located at the intersection between replaced pivot point abscissa of uniformly sampled grid and a line defined by two non-uniform pivot points preceding a replaced pivot point of a non-uniform last slope preservation;

replacing the ordinate value of one or more pivot points following the replaced pivot point with the ordinate value of the replacing pivot point if the replaced pivot point is a last pivot point before saturation;

clipping a sample of the uniformly sampled inverse mapping function based on a clipping value; and encoding a video block using the uniformly sampled forward mapping function, the non-uniformly sampled inverse mapping function, and the uniformly sampled inverse mapping function including a syntax element indicative of said clipping value.

9. A method, comprising:
parsing a bitstream for syntax information indicative of a mapping function; determining a non-uniformly sampled inverse mapping function from a uniformly sampled forward mapping function by swapping coordinates of two or more pivot points of the uniformly sampled forward mapping function and interpolating points between swapped pivot points;

selecting pivot points of the non-uniformly sampled inverse mapping function to be aligned on a uniformly sampled grid to refine the non-uniformly sampled inverse mapping function;

replacing a portion of a uniformly sampled inverse mapping function by a pivot point located at the intersection between replaced pivot point abscissa of uniformly sampled grid and a line defined by two non-uniform pivot points preceding a replaced pivot point of a non-uniform last slope preservation;

replacing an ordinate value of one or more pivot points following the replaced pivot point with an ordinate value of the replacing pivot point if the replaced pivot point is a last pivot point before saturation;

clipping a sample of the uniformly sampled inverse mapping function based on a clipping value; and decoding a video block using the uniformly sampled forward mapping function, the non-uniformly sampled inverse mapping function, and the uniformly sampled inverse mapping function based on said syntax information.

10. The method of claim 9, wherein the replaced pivot point is second to last when a last portion of the uniformly sampled forward mapping function, or the non-uniformly sampled inverse mapping function, curve is constant.

11. The method of claim 9, wherein clipping is performed for values greater than a target range.

12. The method of claim 11, wherein the target range is 1023 for 10-bit reshaping curve.

13. The method of claim 9, wherein the non-uniformly sampled inverse mapping function is extended using a previous slope.

14. A non-transitory computer readable storage medium comprising instructions stored thereon, which when the instructions are is executed by a computer, cause the computer to carry out the method of claim 9.

15. An apparatus, comprising:
a processor, configured to perform:
parsing a bitstream for syntax information indicative of a mapping function;
determining a non-uniformly sampled inverse mapping function from a uniformly sampled forward mapping function by swapping coordinates of two or more pivot points of the uniformly sampled forward mapping function and interpolating points between swapped pivot points;

selecting pivot points of the non-uniformly sampled inverse mapping function to be aligned on a uniformly sampled grid to refine the non-uniformly sampled inverse mapping function;

replacing a portion of a uniformly sampled inverse mapping function by a pivot point located at the intersection between replaced pivot point abscissa of uniformly sampled grid and a line defined by two non-uniform pivot points preceding a replaced pivot point of a non-uniform last slope preservation;

replacing an ordinate value of one or more pivot points following the replaced pivot point with an ordinate value of the replacing pivot point if the replaced pivot point is a last pivot point before saturation;

clipping a sample of the uniformly sampled inverse mapping function based on a clipping value; and decoding a video block using the uniformly sampled forward mapping function, the non-uniformly sampled inverse mapping function, and the uniformly sampled inverse mapping function based on said syntax information.

16. A device comprising:

an apparatus according to claim 15; and at least one of (i) an antenna configured to receive a signal, the signal including the video block, (ii) a band limiter configured to limit the received signal to a band of frequencies that includes the video block, and (iii) a display configured to display an output representative of a video block.

* * * * *